United States Patent
Wang et al.

(10) Patent No.: US 7,363,342 B1
(45) Date of Patent: Apr. 22, 2008

(54) METHOD AND APPARATUS FOR PROVIDING WEB SERVICES IN A COLLABORATIVE COMPUTING SYSTEM

(75) Inventors: Weidong Wang, Lexington, MA (US); John Burkhardt, Arlington, MA (US); Jack E. Ozzie, Chester, NH (US)

(73) Assignee: Microsoft Corporation, Redmond, WA (US)

( * ) Notice: Subject to any disclaimer, the term of this patent is extended or adjusted under 35 U.S.C. 154(b) by 910 days.

(21) Appl. No.: 10/615,281

(22) Filed: Jul. 8, 2003

(51) Int. Cl.
*G06F 15/16* (2006.01)
(52) U.S. Cl. .............. 709/204; 709/205; 709/207; 709/227; 709/228
(58) Field of Classification Search ........ 709/204–207, 709/227–228, 223
See application file for complete search history.

(56) References Cited

U.S. PATENT DOCUMENTS

| | | | | |
|---|---|---|---|---|
| 6,070,191 A * | 5/2000 | Narendran et al. | ......... | 709/226 |
| 6,192,394 B1 * | 2/2001 | Gutfreund et al. | ......... | 709/204 |
| 6,314,465 B1 * | 11/2001 | Paul et al. | ......... | 709/226 |
| 6,681,251 B1 * | 1/2004 | Leymann et al. | ......... | 709/226 |
| 6,687,731 B1 * | 2/2004 | Kavak | ......... | 718/105 |
| 6,928,476 B2 * | 8/2005 | Bucher | ......... | 709/225 |
| 6,968,346 B2 * | 11/2005 | Hekmatpour | ......... | 707/104.1 |
| 7,028,051 B1 * | 4/2006 | McMullan et al. | ......... | 707/104.1 |
| 7,159,008 B1 * | 1/2007 | Wies et al. | ......... | 709/206 |
| 2003/0023679 A1 * | 1/2003 | Johnson et al. | ......... | 709/204 |

* cited by examiner

*Primary Examiner*—Saleh Najjar
*Assistant Examiner*—Faruk Hamza
(74) *Attorney, Agent, or Firm*—Wolf, Greenfield & Sacks, P.C.

(57) ABSTRACT

An API development framework uses a Simple Object Access Protocol (SOAP) protocol to provide access to a collaborative client from a remote user that does not have access to the collaborative software. A WSAP server acts as a bridge between the native collaborative environment and any non-native environment or application that can process SOAP commands and allows the two entities to communicate regardless of firewalls and other security software. The non-native environment can be either local (on the same machine as the collaborative client program) or physically remote (on a different machine). In addition to the server, the illustrative framework includes client side support that is comprised of a SOAP proxy component and remote interfaces to collaborative system objects and platform tools.

23 Claims, 12 Drawing Sheets

METHOD AND APPARATUS FOR PROVIDING WEB SERVICES IN A COLLABORATIVE COMPUTING SYSTEM

FIELD OF THE INVENTION

This invention relates to peer-to-peer collaborative computing systems and to methods and apparatus for providing web services in such a computing environment to allow the collaborative system to be accessed from other applications and platforms.

BACKGROUND OF THE INVENTION

Collaboration involves the ability for each member in a group of members, called "collaborators" to automatically transmit information to, and receive information from, other collaborators in the group. In order to facilitate such collaboration, various systems have been developed that allow such information to be transmitted between personal computer systems, communication appliances or other communication devices, including handheld and wireless devices. Collectively, these devices will be referred to a "computers" in this description.

Computer-based collaboration may occur over a network, such as the Internet, wherein each of the users is located at a computer connected to the network. Several collaboration models are currently being implemented as networked computer collaboration systems. One of these models is a "peer-to-peer" model in which direct connections are established over the network between each of the collaborator computers. Information generated by each collaborator is then sent directly to each other collaborator. In such a system, the collaborators communicate in a private "virtual" shared space. Thus, in such systems, each collaborator has a local copy of the data being collaboratively modified. In order to change the data, a collaborator generates a data change request that is forwarded to each other collaborator. The incoming data change requests are then used by each collaborator to modify its local data copy.

The latter type of collaboration system is described in detail in U.S. patent application Ser. No. 09/357,007 entitled METHOD AND APPARATUS FOR ACTIVITY-BASED COLLABORATION BY A COMPUTER SYSTEM EQUIPPED WITH A COMMUNICATIONS MANAGER, filed Jul. 19, 1999 by Raymond E. Ozzie, Kenneth G. Moore, Robert H. Myhill and Brian M. Lambert; U.S. patent application Ser. No. 09/356,930 entitled METHOD AND APPARATUS FOR ACTIVITY-BASED COLLABORATION BY A COMPUTER SYSTEM EQUIPPED WITH A DYNAMICS MANAGER, filed Jul. 19, 1999 by Raymond E. Ozzie and Jack E. Ozzie; U.S. patent application Ser. No. 09/356,148 entitled METHOD AND APPARATUS FOR PRIORITIZING DATA CHANGE REQUESTS AND MAINTAINING DATA CONSISTENCY IN A DISTRIBUTED COMPUTER SYSTEM EQUIPPED FOR ACTIVITY-BASED COLLABORATION, filed Jul. 19, 1999 by Raymond E. Ozzie and Jack E. Ozzie and U.S. patent application Ser. No. 09/588,195 entitled METHOD AND APPARATUS FOR EFFICIENT MANAGEMENT OF XML DOCUMENTS, filed Jun. 6, 2000 by Raymond E. Ozzie, Kenneth G. Moore, Ransom L. Richardson and Edward J. Fischer.

Such a collaboration system provides a complete interactive environment for small group communications and coordination. However, in order to use such a system it is necessary for each collaborator to have a copy of a client or "transceiver" program resident on his or her computer. If the transceiver program is not available for the platform that the collaborator is using, then the collaborator cannot participate in the collaboration. Therefore, it would be desirable to provide ways of interfacing the collaborative system to other applications, environments and platforms.

SUMMARY OF THE INVENTION

In accordance with the principles of the invention, common interfaces are provided from an open API development framework to provide a standard way to access, process, and store collaborative data. The development framework uses standard Web Services technologies, protocols and methodologies, such as SOAP, WSDL and HTTP.

In one embodiment, the API development framework uses a Simple Object Access Protocol (SOAP) protocol. SOAP is a standard method for packaging XML data for communications between disparate computing environments, often used in Web Services. This protocol allows any end-point on an IP network, including computers with disparate platforms and multiple operating systems, web browsers, and other client environments to access and manipulate the collaborative data.

In this embodiment, a Web Services Access Point (WSAP) server acts as a bridge between the native collaborative environment and any non-native environment or application that can process SOAP commands. The non-native environment can be either local (on the same machine as the collaborative client program) or physically remote (on a different machine). In addition to the WSAP server, the illustrative framework includes client side support that is comprised of a SOAP proxy component and remote interfaces to collaborative system objects and platform tools.

More specifically, any generic SOAP client can call into the WSAP server with a request for the collaborative client. This request is made via SOAP using the Hypertext Transfer Protocol (HTTP). The request is enqueued for the targeted collaborative client, and then sent, via SOAP, over a native transport protocol used by the collaborative system (SSTP). The collaborative client receives the request within the context of a standard collaborative tool component. A method on the tool component is then called and a result returned to the SOAP client via the WSAP server.

BRIEF DESCRIPTION OF THE DRAWINGS

The above and further advantages of the invention may be better understood by referring to the following description in conjunction with the accompanying drawings in which.

DETAILED DESCRIPTION

Figure 1:
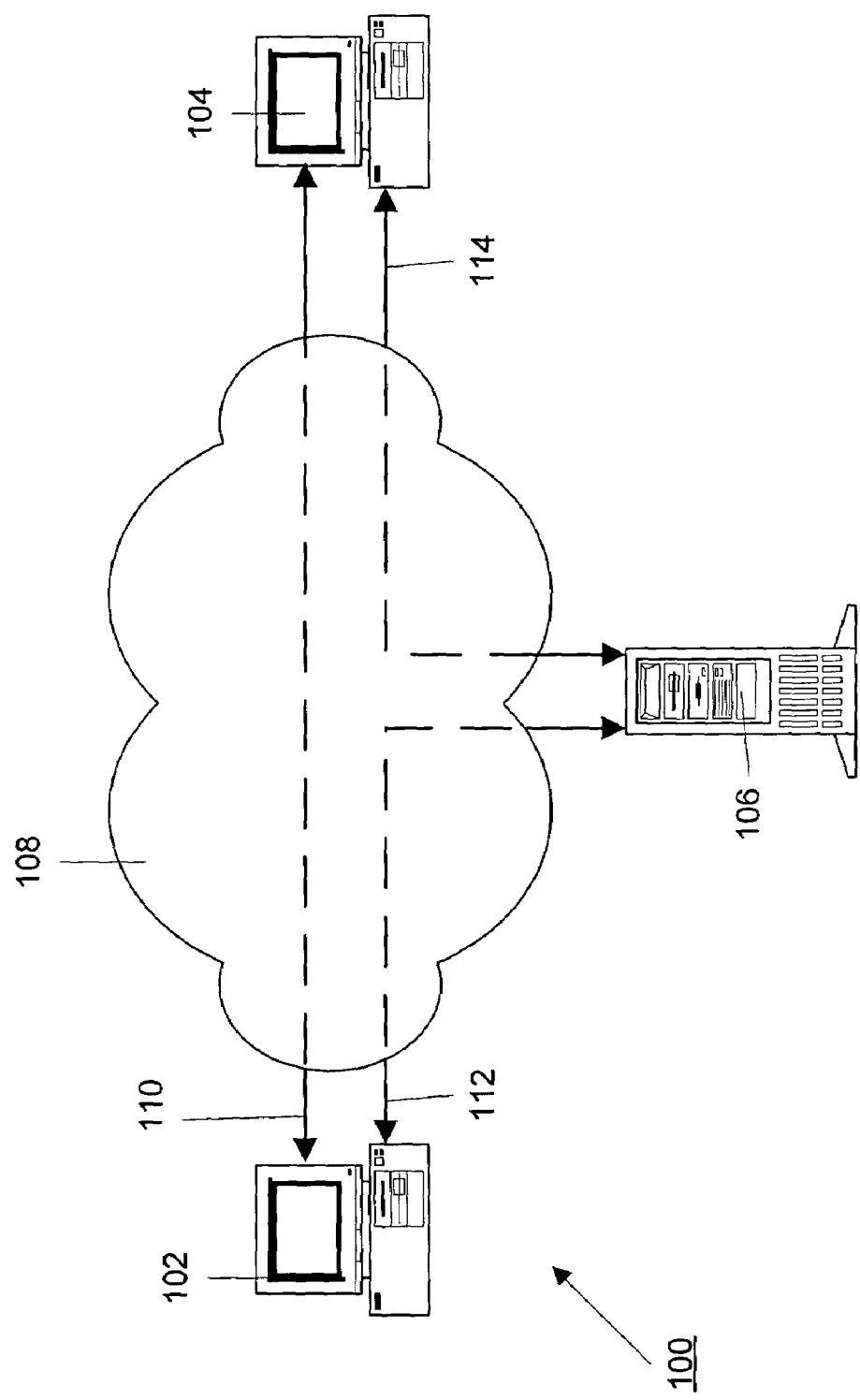
FIG. 1 is a block schematic diagram of a conventional peer-to-peer system using a relay server.

FIG. 1 illustrates, in a very schematic form, a peer-to-peer collaboration system 100 in which collaborating computers are connected to each other by a network 108, such as the Internet. Although various networks can be used with such a system, in the discussion below, the network 108 is assumed to be the Internet. In this system, the collaborating computer systems constitute peer units, of which units 102 and 104 are shown, and communications through the Internet 108 can be directed from one peer unit to another, without intermediaries. Each peer unit 102-104 can be implemented as a personal computer or other form of network-capable device, such as a set top box or hand-held device. The collaborative system is implemented on peer units 102 and 104 by a client program called a "transceiver" that receives and processes communications from other peer units.

Peer-to-peer communications can be made directly between peer units. For example, peer unit 102 may communicate directly with peer unit 104, as indicated schematically by dotted link 110. However, a relay unit 106 is provided to temporarily hold communications that are sent to collaborators when those collaborators are not connected to the network 108. Thus, relay server 106 acts as a store and forward server. If peer unit 102 sends communications to peer unit 104 when peer unit 104 is not connected to network 110, the collaboration system will sent, as indicated by arrow 112, these communications to relay server 106 which holds the communications until peer unit 104 is again connected to network 108. When peer unit 104 connects to network 108, it notifies relay server 106 which then sends all temporarily stored communication to it as indicated by arrow 114.

In one embodiment, each collaborative user has a unique user queue with the relay server 106. Collaborative clients attach to their user queues to receive various messages (including data change commands, identity messages, etc) destined for them, and send messages destined to other collaborative clients to the user queues for those clients (in the case when the direct communication between the collaborative clients is impossible).

Queues may also be provided for other purposes. A queue for a specific purpose is uniquely defined with a triple of {IdentityURL, DeviceURL, ResourceURL}. The resource URL part restricts the type of messages with which the queue deals. For example, there is a unique resource URL for IdentityMessage, and there is unique resource URL for data change messages.

A collaboration system such as that shown in FIG. 1 is available from Groove Networks, Inc., 100 Cummings Center, Suite 535Q, Beverly, Mass. 01915 and is described in detail in the Goove™ Platform Development Kit which is available from Groove Networks, Inc. and on-line from that company's website. In the discussion below, the collaboration system will be assumed to be such a system. However, it will be apparent to those killed in the art that other collaborative systems could also be used with the present invention.

In this collaboration system, a program called an "activity" is resident in each collaborating computer system, communication appliance or other network-capable device. The activity allows a shared, focused task, such as, for example, a "chat", gaming, or business application, to be performed in collaboration with other, remotely-located collaborators. This collaboration involves shared and mutual activities between individuals and small groups in private shared spaces. Each shared space is an instantiation of one or more activities operable on each of the collaborating computers of members of that shared space.

In the system, participants or members of a shared space access the system by opening "accounts" that are associated with "endpoints." Since an individual collaborator may access the system via more than one device, an endpoint is defined as a unique combination of an individual and a device. Each endpoint stores an individual, local copy of the shared space data.

Each activity includes one or more tools, each of which interacts with a collaborator, for example, by receiving mouse and keyboard events, and initiates data change requests in response to the interactions. These data change requests are used locally and sent to other members of the shared space. Each activity also includes one or more data-change engines, separate from the tools, for maintaining the local copy of the shared space data pursuant to a common data model. The data model is, for example, activity-specific, and preferably the same over all members of the shared space. Each collaborating computer also includes a dynamics manager, that examines data change requests generated locally and received from other shared space members and coordinates the execution of the local and other data change requests and directs the data-change engine to make the requested changes to the local copy of data.

In accordance with the principles of the invention, one or more of the peer units, such as units 102 and 104, is modified to include SOAP interfaces (discussed in detail below.) With these interfaces, collaborative access methods are exposed in standard SOAP format so that other platforms can use the SOAP language to communicate and interact with this collaborative client and to extract collaborative data.

This SOAP service provides an integration point where other systems can integrate with the collaborative system. For example, a portal service could be based on a centralized database server. With an integrated system based on the SOAP protocol, it would be possible for the users to use this portal to not only access centralized data from the database, but also to access data from the collaborative system itself.

The modified peer units can also be connected, via a WSAP server, to other applications and environments that do not use the peer unit client software, but can act as collaborative clients. As mentioned above, a WSAP server makes it possible for these new clients to access information within the collaborative system on a wide variety of computing environments.

The WSAP server serves as a translation and relay point for the communication between an external SOAP client and a particular collaborative client. To this end it includes a special SOAP client queue that has a unique resource URL (such as, grooveSOAP://RPC;Version=1,0,0,0) for soap requests and responses and a unique resource URL (groove-SOAP://Event;Version=1,0,0,0) for events. The server makes it possible for two parties to communicate with each other, regardless of the existence of firewalls between them. The SOAP interfaces allow external SOAP clients to access a SOAP engine in that collaborative client and the SOAP engine supports the remote client interfaces. It is also possible to directly access to a collaborative client's SOAP engine, for example with cross-process local RPC calls.

The WSAP server is designed so that it can be configured either as an independent server entity, separated from relay servers, or as coexisting with a relay server. In its independent (de-coupled) mode, a WSAP server acts just as a translation (for protocol) relay agent. Based on the information carried in the SOAP header, the server forwards the actual request to the relay server for the recipient. By using an existing relay server as the point for communicating with the collaborative client, the server can take advantage of the existing relationship between the collaborative client and relay queues and the existing storage management that queues provide. This reduces the programming requirement for the communication between the server and the collaborative client. In its integrated mode, the server can deal with the relay queue infrastructure directly. In both cases, the server hosts the result message by providing queue management functionality.

Figure 2:
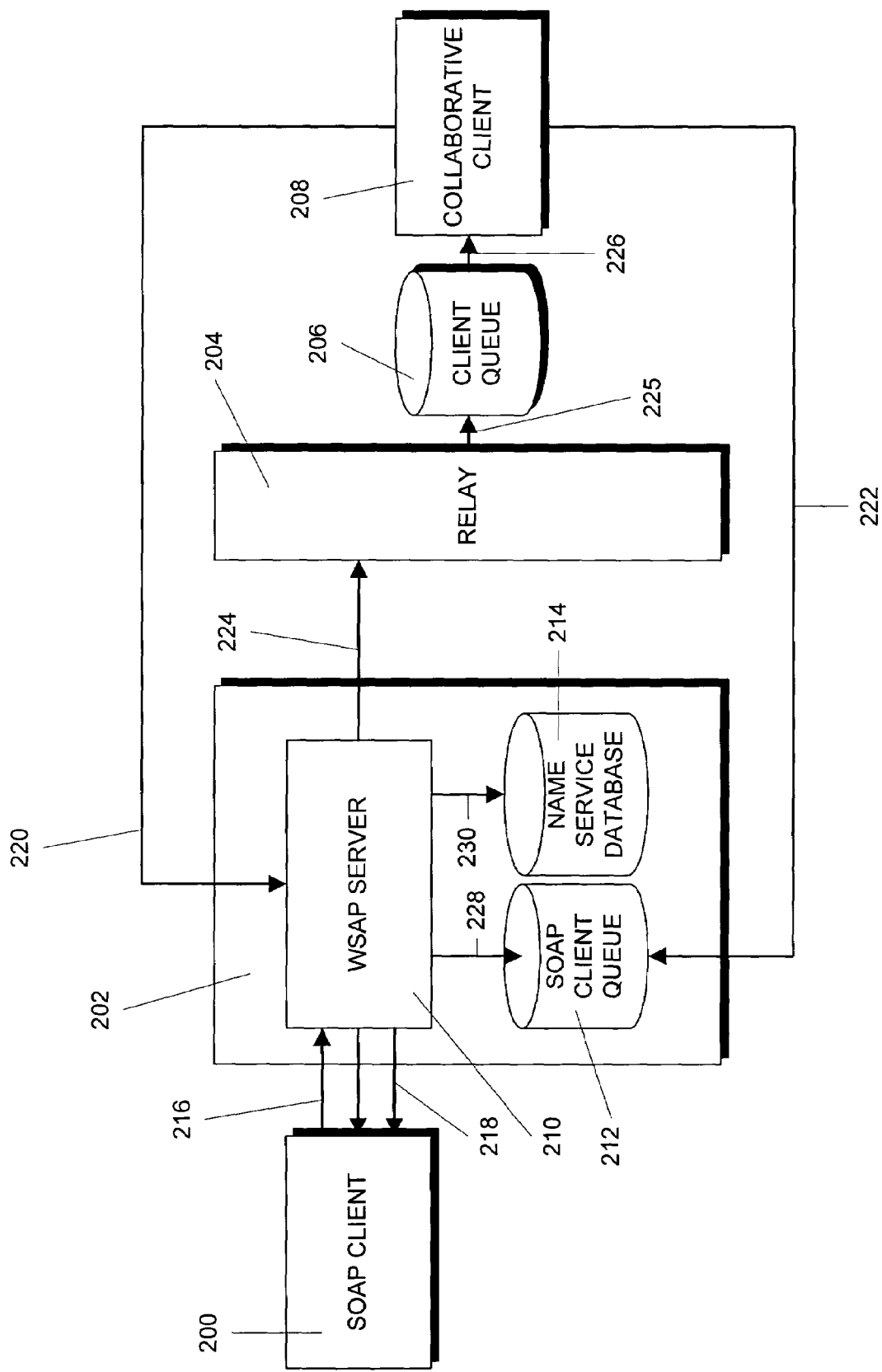
FIG. 2 is a block schematic diagram of a de-coupled system operating in a synchronous mode and constructed in accordance with the principles of the invention.

As shown in FIG. 2, in order to make a SOAP request, a SOAP client 200 sends a SOAP message to the WSAP server 210. Every SOAP message is contained in a SOAP envelope that has a header section and a body section. In accordance with standard SOAP protocol, the header section is optional, but the body part must be present. In the illustrative system, SOAP requests use both the header and body sections. Any information that must be conveyed to the server 210 is placed in the header section, while any information that is to be conveyed to the collaborative client 208 is placed in the body section.

All SOAP calls use a SOAP "fault" to carry any error status. That is, if a response envelope is not a SOAP fault, it indicates a success, and data should be included, if there is any. In a SOAP fault, the "faultcode" value is set to "Client" or "Server". A "Client" fault indicates that the fault is related to a bad request. In this case, the caller should reformat the request and try again. A "Server" fault indicates that there is problem processing the request body. A "detail" section may be present to carry a "GrooveFault" section for more specific information.

A fault can be generated by the server 210, or by the SOAP engine in the collaborative client. In the latter case, if the SOAP engine generates any exception or error, it will format a SOAP Fault envelope and return the message to the sender's queue.

The server 210 can return either "Client" or "Server" fault. "Client" faults are generated when necessary fields in the SOAP envelope are missing. The server 210 can return a "Server" fault of "GESGWTTLEXPIRED" if the time to live established by a SOAP request expires before the server receives any response back from the collaborative client 208.

In either the de-coupled or the integrated modes, the server can operate synchronously or asynchronously. The use of relay servers, such as relay server 204, to send a request to a collaborative client means that all SOAP requests are asynchronous in nature in that a response will not be available until the collaborative client 208 logs on to the network and attaches to its relay server. As such, all SOAP message calls that expect real responses will carry a Time-To-Live (TTL) value, indicating how long the server 210 will wait for a response before quitting. For synchronous calls, the response returns "piggyback" on the HTTP response. Thus, there is one round trip to send a request and get a response. For asynchronous calls, the HTTP response for the request does not carry the actual response and, thus, the SOAP client must make another call to get the response.

To support a synchronous SOAP request, the server 210 will modify the senders device URL so that the response will return to a unique queue 212 associated with that sender. After the WSAP server 210 has forwarded the modified SOAP request envelope to the relay server 204, the server waits on the unique queue 212 for the response. If the time-to-live expires, the server will return a GESGWT-TLEXPIRED fault with the information about the specific queue 212. In this manner, the caller can try to retrieve the response again from the queue 212. The following shows the format for a SOAP request as generated by the SOAP client 200:

```
<s:Envelope . . . >
  <s:Header>
    <GrooveHeader xmlns=
    "http://webservices.groove.net/Groove/1.0/Core/">
      <GrooveTargetName>test</GrooveTargetName>
      <TimeToLive>20</TImeToLive>
    </g:GrooveHeader>
  </s:Header>
  <s:Body>
    <Read xmlns="http://webservices.groove.net/Groove/1.0/Spaces/"/>
  </s:Body>
</s:Envelope>
```

The following shows the request as received by the collaborative system indicating the fields added by the server:

```
<s:Envelope . . . >
  <s: Header>
    <GrooveHeader xmlns="http://webservices.groove.net/Groove/1.0/Core/">
      <GrooveTargetName>test</GrooveTargetName>
      <RemoteClientDeviceURL>dpp://dbde38d394744a37ae043125aed85de7
              </RemoteClientDeviceURL>
      <GatewayURL>grooveDNS://webservices1.groove.net</GatewayURL>
      <GrooveIdentityURL> grooveIdentity://ecsf83va8aesiwetkdjgfg2z3pucvqeh@
              </GrooveIdentityURL>
      <GrooveClientDeviceURL>dpp://r076.groove.net/
```

```
              wtibit4waegbt389hm638qkjg5yvwycqaax2q5s</GrooveClientDeviceURL>
    <GrooveClientRelayURL>grooveDNS://r076.groove.net</GrooveClientRelayURL>
    <TimeToLive>20</TimeToLive>
   </g:GrooveHeader>
   <HTTPHeaders xmlns=http://webservices.groove.net/Groove/1.0/Core/>
    <document>/GWS/Groove/1.0/Spaces/</document>
   </HTTPHeaders>
  </s:Header>
  <s:Body>
   <Read xmlns="http://webservices.groove.net/Groove/1.0/Spaces/"/>
  </s:Body>
</s:Envelope>
```

The following shows the format for a response when the time-to-live has expired:

```
<s:Envelope . . . >
 <s:Body>
  <s:Fault>
   <faultcode>s:Server</faultcode>
   <faultstring>GESGWTTLEXPIRED</faultstring>
   <detail>
    <g:GrooveFault xmlns:g=
    "http://webservices.groove.net/Groove/1.0/Core/">
     <errorreason>gateway returns after time-to-live
     expires</errorreason>
     <MessageID>ecsf83va8aesiwetkdjgfg2z3pucvqeh</MessageID>
    </g:GrooveFault>
   </detail>
  </s:Fault>
 </s:Body>
</s:Envelope>
```

For an asynchronous call (these can be distinguished from synchronous calls because the method name ends with "_a"), once the server 210 has forwarded the SOAP request to the target relay 204, it returns. That is, the HTTP response does not piggyback the actual response. The caller has to make another message services call, Read( ), with one or more message IDs returned with the original requests to retrieve the response or responses.

Since, in the asynchronous mode, responses can come back in arbitrary order, it is important that the caller take steps to correlate a response with a previous SOAP request. A typical SOAP header has an "echo" section that includes data that will be sent back to the caller with the response envelope. In one embodiment, this "echo" section is used to carry a unique identification that can be used to correlate a response with a previous request. For example, the "RequestID" field can be used to carry this unique identification. The following shows the format of an asynchronous SOAP request:

```
<s:Envelope . . . >
 <s:Header>
  <GrooveHeader xmlns=
  "http://webservices.groove.net/Groove/1.0/Core/">
   <GrooveTargetName>test</GrooveTargetName>
   <TimeToLive>20</TImeToLive>
  </g:GrooveHeader>
  <Echo xmlns="http://tempuri">
   <RequestID>1234567890abcd</RequestID>
  </Echo>
 </s:Header>
 <s:Body>
  <Read_a xmlns="http://webservices.groove.net/Groove/1.0/Spaces/"/>
 </s:Body>
</s:Envelope>
```

The following shows the format of the response to the above asynchronous request. Note that this is not a real response due to the asynchronous nature of the call:

```
<s:Envelope . . . >
 <s:Body>
  <Read_aResponse xmlns=
  "http://webservices.groove.net/Groove/1.0/Spaces/"">
   <MessageID>ecsf83va8aesiwetkdjgfg2z3pucvqeh</MessageID>
  </Read_aResponse>
 </s:Body>
</s:Envelope>
```

The following shows the format of a request to retrieve the real response from the server in asynchronous mode.

```
<s:Envelope . . . >
 <s:Header>
  <GrooveHeader xmlns=
  "http://webservices.groove.net/Groove/1.0/Core/">
   <GrooveTargetName>test</GrooveTargetName>
   <TimeToLive>20</TImeToLive>
  </g:GrooveHeader>
 </s:Header>
 <s:Body>
  <Read xmlns="http://webservices.groove.net/Groove/1.0/Messages/">
   <MessageID>ecsf83va8aesiwetkdjgfg2z3pucvqeh</MessageID>
  </Read>
 </s:Body>
</s:Envelope>
```

Finally, the following shows the format of the real response as received from the collaborative client:

```
<s:Envelope . . . >
 <s:Header>
  <Echo>
   <RequestID>1234567890abcd</RequestID>
  </Echo>
 </s:Header>
 <s:Body>
  < ReadResponse xmlns=
  http://webservices.groove.net/Groove/1.0/Spaces/">
   . . . (real data comes here)
  </ReadResponse>
 </s:Body>
</s:Envelope>
```

Notice the return of the original "echo" section. The request ID in that section can be used to correlate the response with a previous SOAP request.

It is also possible that the response could be a SOAP "fault" message. The following is an example of a SOAP fault message corresponding to a synchronous call that fails to get response back due to time out:

```
<s:Envelope . . . >
 <s:Body>
  <s:Fault>
   <faultcode>s:Server</faultcode>
   <faultstring>GESGWTTLEXPIRED</faultstring>
   <detail>
    <g:GrooveFault xmlns:g=
    "http://webservices.groove.net/Groove/1.0/Core/">
     <errorreason>gateway returns after time-to-live
   expires</errorreason>
     <MessageID>ecsf83va8aesiwetkdjgfg2z3pucvqeh</MessageID>
    </g:GrooveFault>
   </detail>
  </s:Fault>
 </s:Body>
</s:Envelope>
```

Notice the unique "MessageID" being returned to the caller, making it possible for the caller to try again to retrieve the response.

If a request carries an "Echo" section in its header, when the SOAP engine on the collaborative client generates a SOAP fault, it should add this "Echo" section to the envelope header part, so that the caller can correlate this fault to a previous request. The following is an example of such a SOAP message:

```
    <s:Envelope . . . >
     <s:Header>
      <Echo>
       <RequestID>1234567890abcd</RequestID>
      </Echo>
     </s:Header>
     <s:Body>
      <s:Fault>
       <faultcode>s:Server</faultcode>
       <faultstring>TOOLNOTFOUND</faultstring>
       <detail>
        <g:GrooveFault xmlns:g=
        "http://webservices.groove.net/Groove/1.0/Core/">
         <errorreason>Tool no longer exists</errorreason>
        </g:GrooveFault>
       </detail>
      </s:Fault>
     </s:Body>
    </s:Envelope>
```

With asynchronous mode, a dedicated thread handles the polling of result messages. Depending on the application, polling can either request to return immediately if there is nothing available (a zero time to live value), or wait until there is a result (a huge value or −1 TTL value). This thread, based on the type of the message returned, processes them accordingly and returns to poll again.

In synchronous mode, it is important to note that if a synchronous call with a TTL value comes back indicating the TTL has expired, the client can, if desired, poll again using the specific returned message ID. This will ensure that the server will poll the right queue (the one specific for that request, keyed by its Message ID).

FIG. 2 is a block schematic diagram that illustrates a WSAP server 210 in a de-coupled system and operating in a synchronous mode. As shown in FIG. 2, a SOAP client 200 uses a WSAP server 210 to access a collaborative client 208, via a relay server 204. The WSAP server 210 itself acts as a SOAP server, exposing SOAP service interfaces, and accepting SOAP requests. The server 202 can be built on top of the relay server program code base, but the server 210 only uses the relay storage management to handle SOAP response queues and does not host any collaborative user queues.

Figure 3:
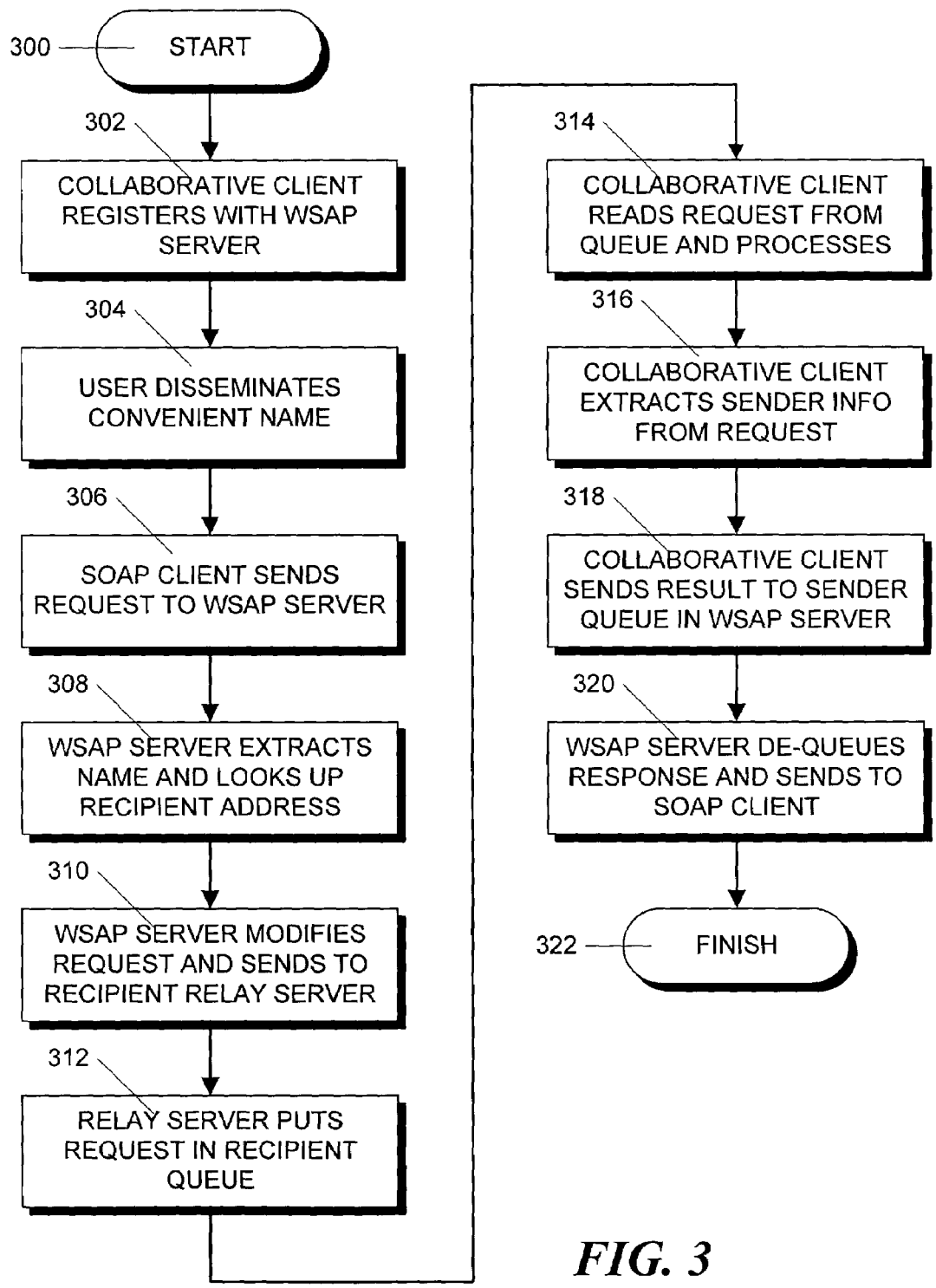
FIG. 3 is a flowchart that shows the steps in an illustrative process for processing a SOAP request using the system of FIG. 2.

FIG. 3 is a flowchart that shows the steps in an illustrative synchronous process by which the SOAP client accesses the collaborative client data. This process begins in step 300 and proceeds to step 302 where a collaborative client 208 that wants to expose its remote client interface registers a "convenient" name with the name service database in associated with the WSAP server 210. This operation is illustrated schematically by arrow 220. The convenient name is some unique name that can easily be associated with the service that is being exported. At the registration time, the collaborative client 208 associates this name with a number of name-value pairs, with information about the user (identity URL), user's device information (device URL, optional), user's relay information (relay URL), among other information. In step 304, the owner of the collaborative client 208 then disseminates this convenient name to those who want to use SOAP interface to reach this collaborative client. The name is provided using an "out-of-band" method, such as e-mail, telephone call, etc.

Later, as set forth in step 306, a SOAP client makes a SOAP request to the WSAP server 210 by sending a SOAP message as indicated schematically by arrow 216. Since the WSAP server 210 must obtain the convenient name of the collaborative client 208 so that it can perform a name lookup in the name service database 214 to find the access information for the collaborative client 208, this name appears in the header. Another piece of information that is usually included with the request header is the aforementioned time-to-live value.

The following is an example of a synchronous request message that is used to get all shared spaces at the collaborative client, using a convenient name of "wtest":

```
<SOAP-ENV:Envelope xmlns:SOAP-ENV=
"http://schemas.xmlsoap.org/soap/envelope/">
 <SOAP-ENV:Header>
  <GrooveHeader xmlns=
  "http://webservices.groove.net/Groove/1.0/Core/">
   <GrooveTargetName>wtest</GrooveTargetName>
   <TimeToLive>30</TimeToLive>
  </GrooveHeader>
 </SOAP-ENV:Header>
 <SOAP-ENV:Body>
  <Read xmlns="http://webservices.groove.net/Groove/1.0/Spaces/"/>
 </SOAP-ENV:Body>
</SOAP-ENV:Envelope>
```

In step 308, upon receiving a SOAP request, the WSAP server first checks the HTTP header element of "Content-Type" to determine whether this is a regular SOAP envelope or this is a DIME message. In the latter case, it parses the DIME message to extract the SOAP envelope. Then the SOAP envelope is parsed to see whether it is a valid XML document and complies with SOAP specification. Any failure will cause a SOAP fault to be sent back to the sender. The WSAP server 210 then checks the HTTP POST URI to determine what service this request concerns. For requests for services that the server provides itself (such as a name service, message service or remote events service), the server processes the request and returns the response with the HTTP response. For services provided by the collaborative client 208, the WSAP server checks the SOAP header and extracts the convenient name of the collaborative client 208. It then performs a name lookup with the name service database 214 as indicated schematically by arrow 230. It also checks the availability of the access information (user identity URL, relay URL, and optional device URL) for the collaborative client 208. This information identifies the relay server 204 and the client queue 206 for this collaborative client 208.

In step 310, the server 210 modifies the SOAP request so that the response will return to the SOAP client queue 212. For example, the server 210 inserts the result of the name lookup in database 214 into the SOAP request as the new header information, along with its own URL (such as grooveDNS://webservices1.groove.net), the HTTP POST URI value (obtained from the HTTP/HTTPS header) and a unique message ID as the source client device URL into the SOAP header. The WSAP server URL identifies the WSAP server that handled the incoming request to that the SOAP engine in the collaborative client can send the response back to the same server. The HTTP POST URI is used by the SOAP engine to determine the service and method with which this call is concerned. Then the server checks whether it is in the relay for the collaborative client 208 (the recipient). If it is not in this relay, the server uses a native protocol, called the SSTP protocol, to send the modified SOAP request (in its complete SOAP envelope format) to the recipient's relay 204 as indicated schematically by arrow 224. The SSTP protocol is described in detail in the aforementioned Groove Platform Developers SDK.

In step 312, the relay server 204 places the request in the recipient's queue 206 as indicated schematically by arrow 225. Alternatively, if the server is in the recipient's relay then the modified SOAP request is enqueued directly into the recipient's queue 206 as this server/relay will be the relay 204 serving the recipient.

As discussed above, by relay nature, the communication between a relay server 204 and a collaborative client 208 is asynchronous. This is because only the collaborative client can initiate a connection to the relay server 204 due to firewall/NAT problems. For this reason, the communication between the SOAP client 200 and the collaborative client 208 will be asynchronous as well.

Once the modified request is en-queued into the recipient's queue 206, the WSAP server 210 waits for the response to return to a queue 212 for the calling SOAP client 200 as indicated schematically by arrow 228. For each request, the WSAP server 210 will generate a unique message ID and insert it into the request header as the caller's "device" URL. This information, along with the WSAP server URL and the user identity URL (both inserted by the server 210 into the SOAP request header), informs the recipient 208 where to send the response.

As indicated in step 314, the collaborative client 208 eventually reads the request from its queue 206 (indicated by arrow 226) and processes the request. In step 316, client 208 then extracts from the request the sender contact information, including the sender's server URL, identity URL and device URL. Such information, along with a fixed (well-known) resource URL for SOAP processing, uniquely identifies the SOAP client queue 212 on the server 210. In step 318, the collaborative client 208 sends the result, in a SOAP response envelope format, to the server 210 for the SOAP client 200, by putting the result into the SOAP client queue (as indicated schematically by arrow 222.)

The server 210, after sending the SOAP request to the recipient's relay 204, has been waiting on the result queue 212. If a response is ready before the time-to-live expires, it is returned as-is as the SOAP response for the original SOAP request. If no response is ready before the expiration, the response is a SOAP fault message that contains the indication that there is no response available. In that case, the fault message will carry the message ID used for this call, so that if desired, the SOAP client can call a Read( ) method with the specific Message ID to poll the response again.

If the Read( ) call is made to retrieve a response of a previous synchronous call that did not receive a response due to timeout, the Message ID, which is returned to the caller in the SOAP fault message that indicated a time out, is needed to specify as a call parameter, so that the server 210 will wait at a specific queue.

In step 320, when the server 210 notices the new arrival of the data in the result queue 212, it de-queues the response envelope and returns it as the response for the original SOAP request as indicated by arrow 218. The process then finishes in step 322

Figure 4:
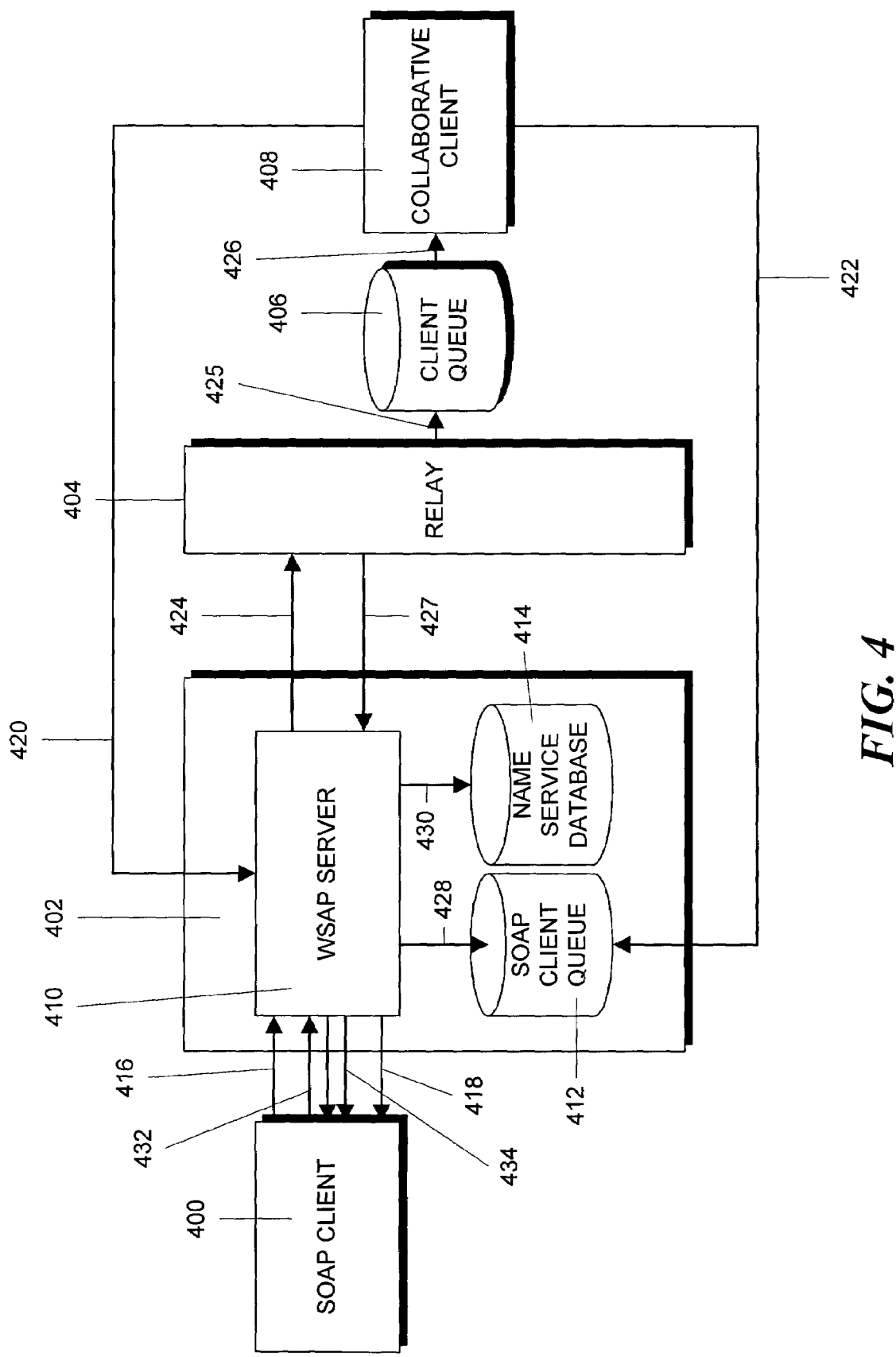
FIG. 4 is a block schematic diagram of a de-coupled system operating in an asynchronous mode and constructed in accordance with the principles of the invention.

FIG. 4 is a block schematic diagram that illustrates a WSAP server 410 in a de-coupled system and operating in an asynchronous mode. This system operates in a manner very similar to the synchronous mode described in connection with FIGS. 2 and 3. Thus, in FIG. 4, elements that correspond to elements in FIG. 2 have been given corresponding numeral designations. For example, SOAP client 200 corresponds to SOAP client 400. As shown in FIG. 4, a SOAP client 400 uses a WSAP server 410 to access a collaborative client 408 via a relay server 404.

Figure 5:
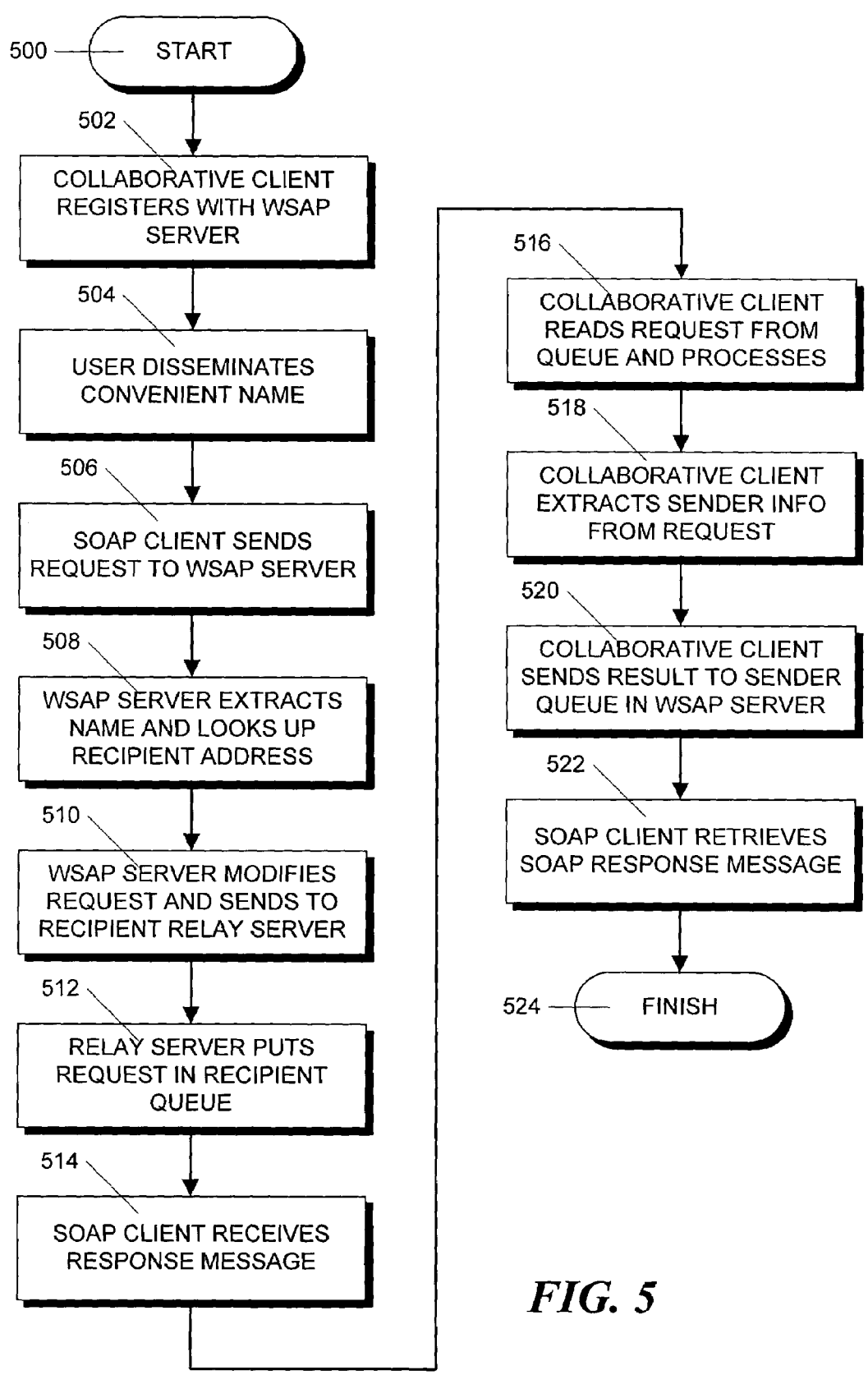
FIG. 5 is a flowchart that shows the steps in an illustrative process for processing a SOAP request using the system of FIG. 4.

FIG. 5 is a flowchart that shows the steps in an illustrative asynchronous process by which the SOAP client 400 accesses the collaborative client data. This process begins in step 500 and proceeds to step 502 where a collaborative client 408 that wants to expose its remote client interface registers a convenient name with the name service database in associated with the WSAP server 410. This operation is illustrated schematically by arrow 420. At the registration time, the collaborative client 408 associates this name with a number of name-value pairs, with information about the user (identity URL), user's device information (device URL, optional), user's relay information (relay URL), among other information. In step 504, the owner of the collaborative client 408 then disseminates this convenient name to those who want to use SOAP interface to reach this collaborative client. The name is provided using an "out-of-band" method, such as e-mail, telephone call, etc.

Later, as set forth in step 506, a SOAP client, such as client 400, makes a SOAP request to the WSAP server 410 by sending a SOAP message as indicated schematically by arrow 416. Since the server 410 must obtain the convenient name of the collaborative client 408 so that it can perform a name lookup in the name service database 414 to find the access information for the collaborative client 408, this name appears in the header. Another piece of information that is usually included with the request header is the aforementioned TTL value. An "echo" section is also included as discussed above.

The following is an example of an asynchronous request message that is used to get all shared spaces at the collaborative client, using a convenient name of "wtest":

```
<SOAP-ENV:Envelope xmlns:SOAP-ENV=
"http://schemas.xmlsoap.org/soap/envelope/">
  <SOAP-ENV:Header>
    <Echo xmlns=http://tempuri/>
      <RequestID>j5e77spwsea42nrksfg2mxknwq966fnafai63is</RequestID>
    </Echo>
    <GrooveHeader xmlns=
"http://webservices.groove.net/Groove/1.0/Core/">
      <GrooveTargetName>wtest</GrooveTargetName>
      <TimeToLive>30</TimeToLive>
    </GrooveHeader>
  </SOAP-ENV:Header>
  <SOAP-ENV:Body>
    <Read_a xmlns="http://webservices.groove.net/Groove/1.0/Spaces/"/>
  </SOAP-ENV:Body>
</SOAP-ENV:Envelope>
```

Note that the method (Read_a) is identified by an "_a" suffix. In addition, note the "echo" section that contains a unique identification in the RequestID section. This unique identification will later be returned in the response and is used to correlate a response with a previous request as explained below.

In step 508, upon receiving a SOAP request, the server checks the SOAP header and extracts the convenient name of the collaborative client 408. It then performs a name lookup with the name service database 414 as indicated schematically by arrow 430. It also checks the availability of the access information (user identity URL, relay URL, and optional device URL) for the collaborative client 408. This information identifies the relay server 404 and the client queue 406 for this collaborative client 408.

In step 510, the server 410 modifies the SOAP request so that the response will return to the SOAP client queue 412. For example, the server 410 inserts the result of the name lookup in database 414 into the SOAP request as the new header information, along with its own URL (ServerURL) and the HTTP POST URI VALUE (from the HTTP header) and a unique message ID as the source client device URL into the SOAP header. Then the server checks whether it is in the relay for the collaborative client 408 (the recipient). If it is not in this relay, the server uses the SSTP protocol to send the modified SOAP request (in its complete SOAP envelope format) to the recipient's relay 404 as indicated schematically by arrow 224.

In step 512, the relay server 404 places the request in the recipient's queue 406 as indicated schematically by arrow 425 and returns a result to the WSAP server (shown as arrow 427) indicating that the request has been placed in the recipient's queue 406. Alternatively, if the server is in the recipient's relay then the modified SOAP request is enqueued directly into the recipient's queue 406 as this server/relay will be the relay 404 serving the recipient.

For asynchronous SOAP requests, the server 410 returns a response (indicated schematically by arrow 418 after it has successfully put the request into the collaborative client queue 406, or has successfully forwarded the request to the recipient's relay server 404. This is set forth in step 514. However, this response, which could be a SOAP "fault" as discussed above, does not carry the collaborative client's response but only carries the unique message ID generated by the server and a status code that indicates whether the above operation is successful or not. The actual response from the collaborative client 408 will be returned later, as described below. The following is an example of a response for an asynchronous SOAP request indicating that a SOAP request (Read_a for spaces) has been en-queued:

```
<SOAP-ENV:Envelope xmlns:SOAP-ENV=
"http://schemas.xmlsoap.org/soap/envelope/">
  <SOAP-ENV:Body>
    <Read_aResponse xmlns=
    http://webservices.groove.net/Groove/1.0/Spaces/">
      <MessageID>4312180bf57041318f10b9e8d48e81b3</MessageID>
    </Read_aResponse>
  </SOAP-ENV:Body>
</SOAP-ENV:Envelope>
```

In this response, no actual status is returned, as the return of a normal SOAP envelope indicates a success. If any error occurs, a SOAP Fault will be returned.

As indicated in step 516, the collaborative client 408 eventually reads the request from its queue 406 (indicated by arrow 426) and processes the request. In step 518, client 408 then extracts from the request the sender contact information, including the sender's server URL, identity URL and the generated device URL. Such information, along with a fixed (well-known) resource URL for SOAP processing, uniquely identifies the SOAP client queue 412 on the server 402. In step 520, the collaborative client 408 sends the result, in a SOAP response envelope format, to the server 410 for the SOAP client 400, by putting the result into the SOAP client queue (as indicated schematically by arrow 422.)

In asynchronous mode, the SOAP client 400 is responsible to poll the WSAP server 410 for any responses using a message services Read( ) call as set forth in step 522. The response to the Read( ) call will be in a SOAP response envelope and, if a response has been returned from the collaborative client 408, the response to the Read( ) call will be the SOAP response received from the collaborative client 408. If a response has not been received from the collaborative client 208, then the Read( ) call response will be a SOAP fault message indicating that there was no response available before the TTL expired. It is important to note that no assumption can be made concerning the order in which the SOAP responses are returned. Therefore, the caller is responsible for correlating a response with a previous request. This correlation is performed with an "echo" section in the SOAP header that carries a unique identification. In one embodiment, this unique identification is carried in the RequestID section of the SOAP header. This echo section is returned with the response and can be used to correlate the response with a previous request.

The following is an example of a Read( ) call that can be issued by the SOAP client 400 and that attempts to poll for a response:

```
<SOAP-ENV:Envelope xmlns:SOAP-ENV=
"http://schemas.xmlsoap.org/soap/envelope/">
  <SOAP-ENV:Header>
    <GrooveHeader xmlns=
"http://webservices.groove.net/Groove/1.0/Core/">
      <GrooveTargetName>wtest</GrooveTargetName>
      <TimeToLive>999999</TimeToLive>
    </GrooveHeader>
  </SOAP-ENV:Header>
  <SOAP-ENV:Body>
    <Read xmlns="http://webservices.groove.net/Groove/1.0/Messages/">
      <MessageID>4312180bf57041318f10b9e8d48e81b3</MessageID>
    </Read>
  </SOAP-ENV:Body>
</SOAP-ENV:Envelope>
```

In this example, the call will tell the server 410 to wait at the response queue 412 for the given SOAP client (with its target name and message ID) and return only when it has read a response message, or return empty after 999999 seconds.

The WSAP server 410 then returns a response, as set forth in step 524, if either a response has been received from the collaborative client 408 or the TTL has expired. The following is an example of a response to Read( ) call with no response:

```
<s:Envelope xmlns:s="http://schemas.xmlsoap.org/soap/envelope/">
  <s:Body>
    <s:Fault>
      <faultcode>s:Server</faultcode>
      <faultstring>GESGWTTLEXPIRED</faultstring>
      <detail>
        <g:GrooveFault xmlns:g=
        "http://webservices.groove.net/Groove/1.0/Core/">
          <errorreason>gateway returns after time-to-live
          expires</errorreason>
          <MessageID>ecsf83va8aesiwetkdjgfg2z3pucvqeh</MessageID>
        </g:GrooveFault>
      </detail>
    </s:Fault>
  </s:Body>
</s:Envelope>
```

The following is an example of a response to Read( ) call that returns with a response from the collaborative client 408 to the aforementioned Read_a( ) request:

```
<soap:Envelope xmlns:soap="http://schemas.xmlsoap.org/soap/envelope">
  <soap:Header>
    <Echo xmlns=http://tempuri/>
      <RequestID>j5e77spwsea42nrksfg2mxknwq966fnafai63is</RequestID>
    </Echo>
  </soap:Header>
  <soap:Body>
    <Read_aResponse xmlns="http://webservices.groove.net/Groove/1.0/Spaces/">
      <ReadResult xmlns="http://webservices.groove.net/Groove/1.0/Spaces/">
        <Space>
          <URI>grooveTelespace://skw3cuyxya4d8kwnqxm47bftci6ih97puzdjet2</URI>
          <Name>test2</Name>
          <Description>My Test Space</Description>
          <Created>2002-12-02T11:28:40.025-05:00</Created>
          <Modified>2002-12-04T16:32:50.795-05:00</Modified>
          <Local>true</Local>
          <IdentityURL>grooveIdentity://w78jcypifdvbi9e893tt92a3dc72nssd@</IdentityURL>
          <Tools>/GWS/Groove/1.0/Tools/
             grooveTelespace/skw3cuyxya4d8kwnqxm47bftci6ih97puzdjet2</Tools>
          <Members>
            <URI>grooveIdentity://j3dwkub9gxxqpi6zuhjhvb7hiryfmycw@</URI>
            <URI>grooveIdentity://w78jcypifdvbi9e893tt92a3dc72nssd@</URI>
          </Members>
        </Space>
      <ReadResult>
    </Read_aResponse>
  </soap:Body>
</soap:Envelope>
```

Note the return of the "echo" section in the SOAP header that is used to correlate this response with a previous request. The process then finishes in step 524.

Figure 6:
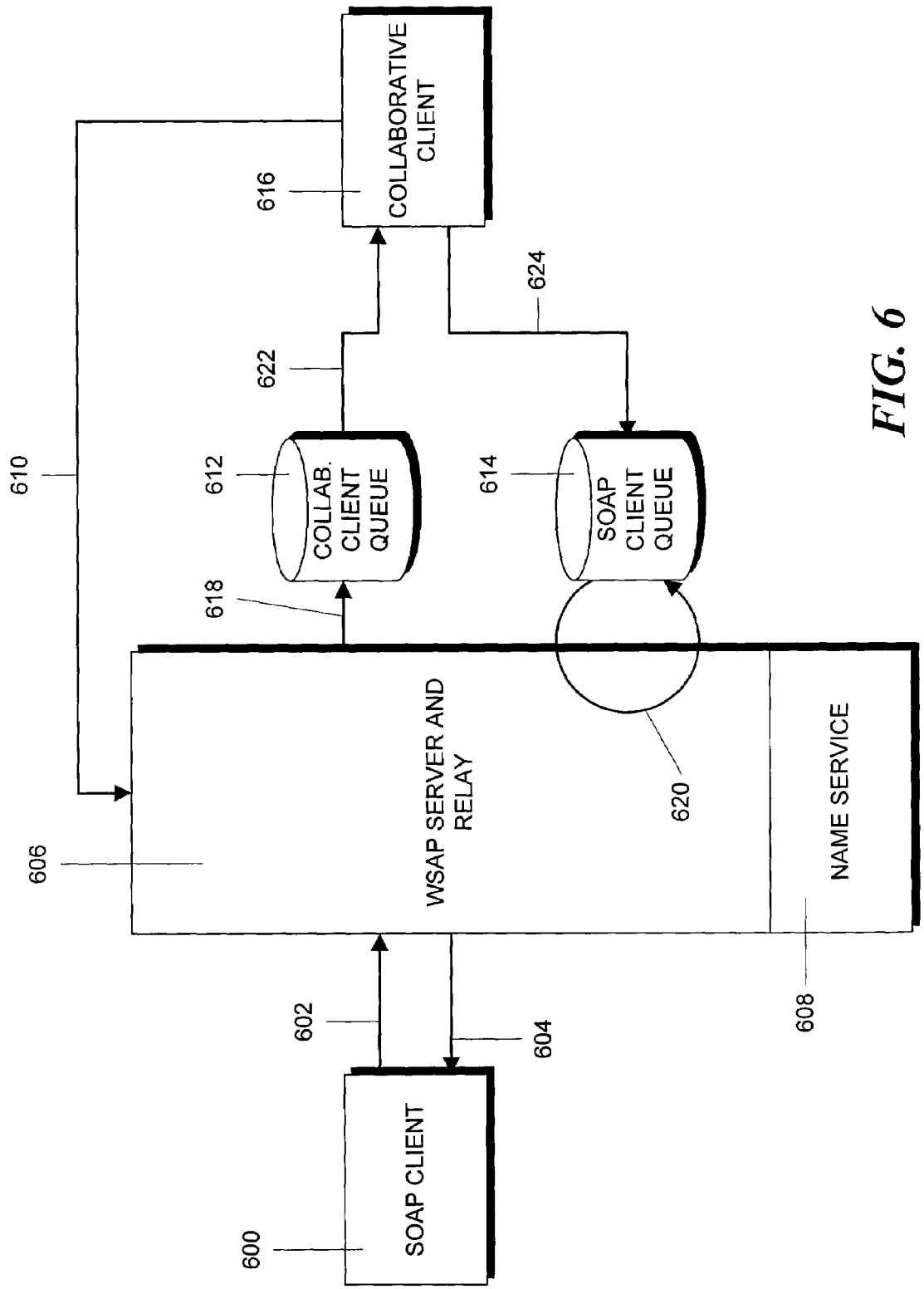
FIG. 6 is a block schematic diagram of an integrated system operating in a synchronous mode and constructed in accordance with the principles of the invention.

In the integrated mode, the WSAP server code is also built on top of the relay server code, and provides the functions of a normal relay server. FIG. 6 is a block schematic diagram that shows a WSAP server in an integrated system and operating in a synchronous mode. In this figure, it is assumed that the WSAP server/relay 606 is also the relay server used by the collaborative client 616.

Figure 7:
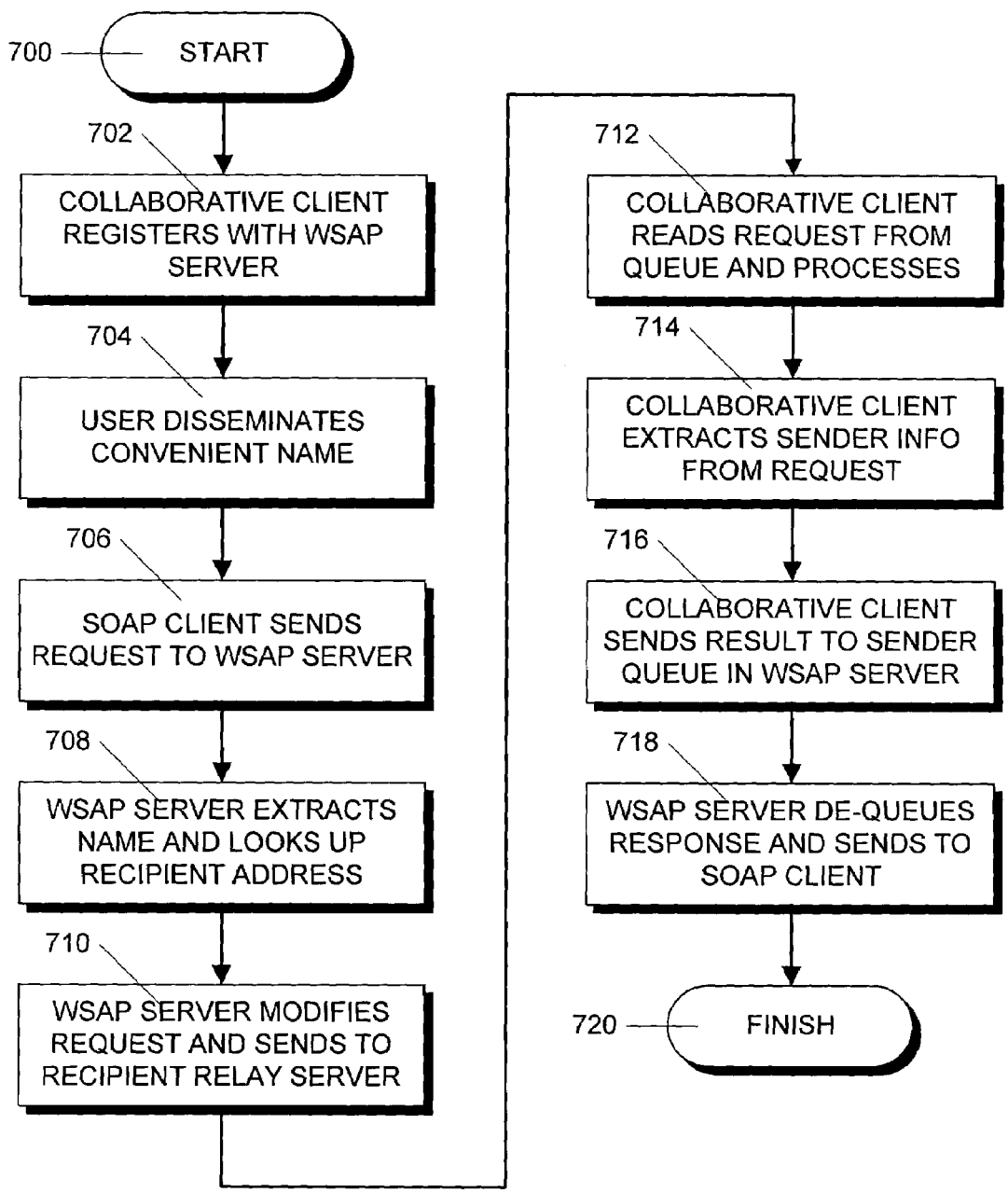
FIG. 7 is a flowchart that shows the steps in an illustrative process for processing a SOAP request using the system of FIG. 6.

FIG. 7 is a flowchart that shows the steps in an illustrative synchronous process by which the SOAP client 600 accesses the collaborative client data. This process begins in step 700 and proceeds to step 702 where a collaborative client 616 that wants to expose its remote client interface registers a convenient name with the name service database in associated with the WSAP server 606. This operation is illustrated schematically by arrow 610. At the registration time, the collaborative client 616 associates this name with a number of name-value pairs, with information about the user (identity URL), user's device information (device URL, optional), user's relay information (relay URL), among other information. In step 704, the owner of the collaborative client 616 then disseminates this convenient name to those who want to use the SOAP interface to reach this collaborative client. The name is provided using an "out-of-band" method, such as e-mail, telephone call, etc.

Later, as set forth in step 706, a SOAP client, such as client 600, makes a SOAP request to the server 606 by sending a SOAP message as indicated schematically by arrow 602. Since the server 606 must obtain the convenient name of the collaborative client 616 so that it can perform a name lookup in the name service database 608 to find the access information for the collaborative client 616, this name appears in the header. Another piece of information that is usually included with the request header is the aforementioned TTL value.

In step 708, upon receiving a SOAP request, the server 606 checks the SOAP header and extracts the convenient name of the collaborative client 616. It then performs a name lookup with the name service database 608. It also checks the availability of the access information (user identity URL, relay URL, and optional device URL) for the collaborative client 616. This information identifies the client queue 612 for this collaborative client 616.

In step 710, the server 606 modifies the SOAP request so that the response will return to the SOAP client queue 614. For example, the server 606 inserts into the SOAP header, as new header information, the result of the name lookup in database 608, the HTTP POST URI value (from the HTTP header) and a unique message ID, which is generated by the server 606 and serves as the source client "device" URL. The server 606 then places the request in the recipient's queue 612 as indicated schematically by arrow 618.

Once the modified request is en-queued into the recipient's queue 612, the server 606 waits for a response to return to a queue 614 for the calling SOAP client 600. As indicated in step 712, the collaborative client 616 eventually reads the request from its queue 612 (indicated by arrow 622) and processes the request. In step 714, client 616 then extracts from the request the sender contact information, including the sender's server URL, identity URL and device URL (unique message ID.) Such information, along with a fixed (well-known) resource URL for SOAP processing, uniquely identifies the SOAP client queue 614 on the server/relay server 606. In step 716, the collaborative client 616 sends the result, in a SOAP response envelope format, to the server 606, by putting the result into the SOAP client queue 614 (as indicated schematically by arrow 624.)

The server 606, after placing the SOAP request in the recipient's queue 612, will wait on the result queue 614 as indicated by arrow 620. If a response is ready before the TTL expires, It is returned as-is as the SOAP response for the original SOAP request. If no response is ready before the expiration, the response is a SOAP fault message that contains the indication that there is no response available. In that case, the fault message will carry the message ID used for this call, so that if desired, the SOAP client can call a message services Read( ) method with the specific message ID to poll the response again.

In step 718, when the server 606 notices the new arrival of the data in the result queue 614, it de-queues the response envelope and returns it as the response for the original SOAP request as indicated by arrow 604. The process then finishes in step 720.

Figure 8:
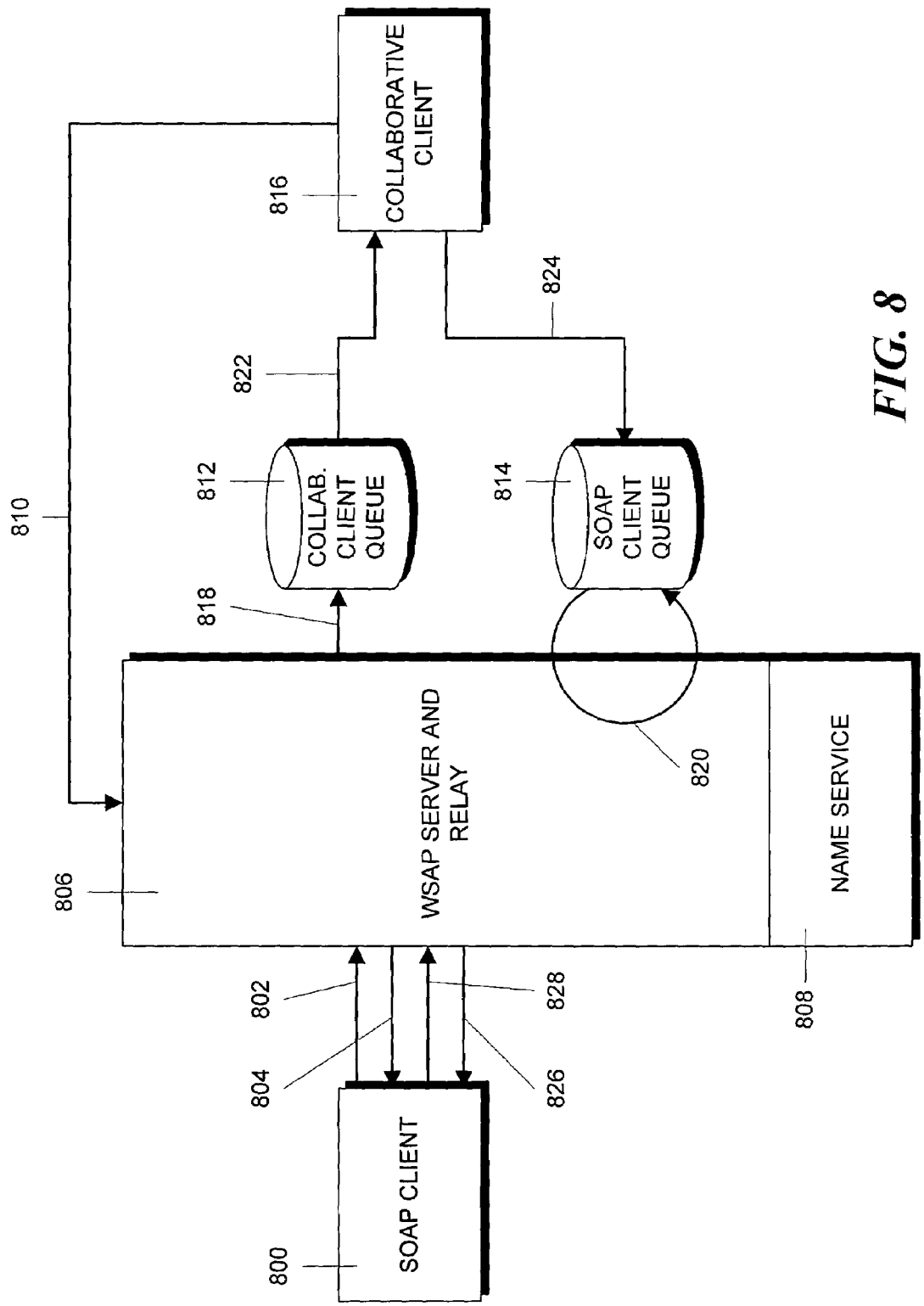
FIG. 8 is a block schematic diagram of an integrated system operating in an asynchronous mode and constructed in accordance with the principles of the invention.

FIG. 8 is a block schematic diagram that illustrates a WSAP server 806 in an integrated system and operating in an asynchronous mode. This system operates in a manner very similar to the synchronous mode described in connection with FIGS. 6 and 7. Thus, in FIG. 8, elements that correspond to elements in FIG. 6 have been given corresponding numeral designations. For example, SOAP client 600 corresponds to SOAP client 800. As shown in FIG. 8, a SOAP client 800 uses a WSAP server/relay 806 to access a collaborative client 816.

Figure 9:
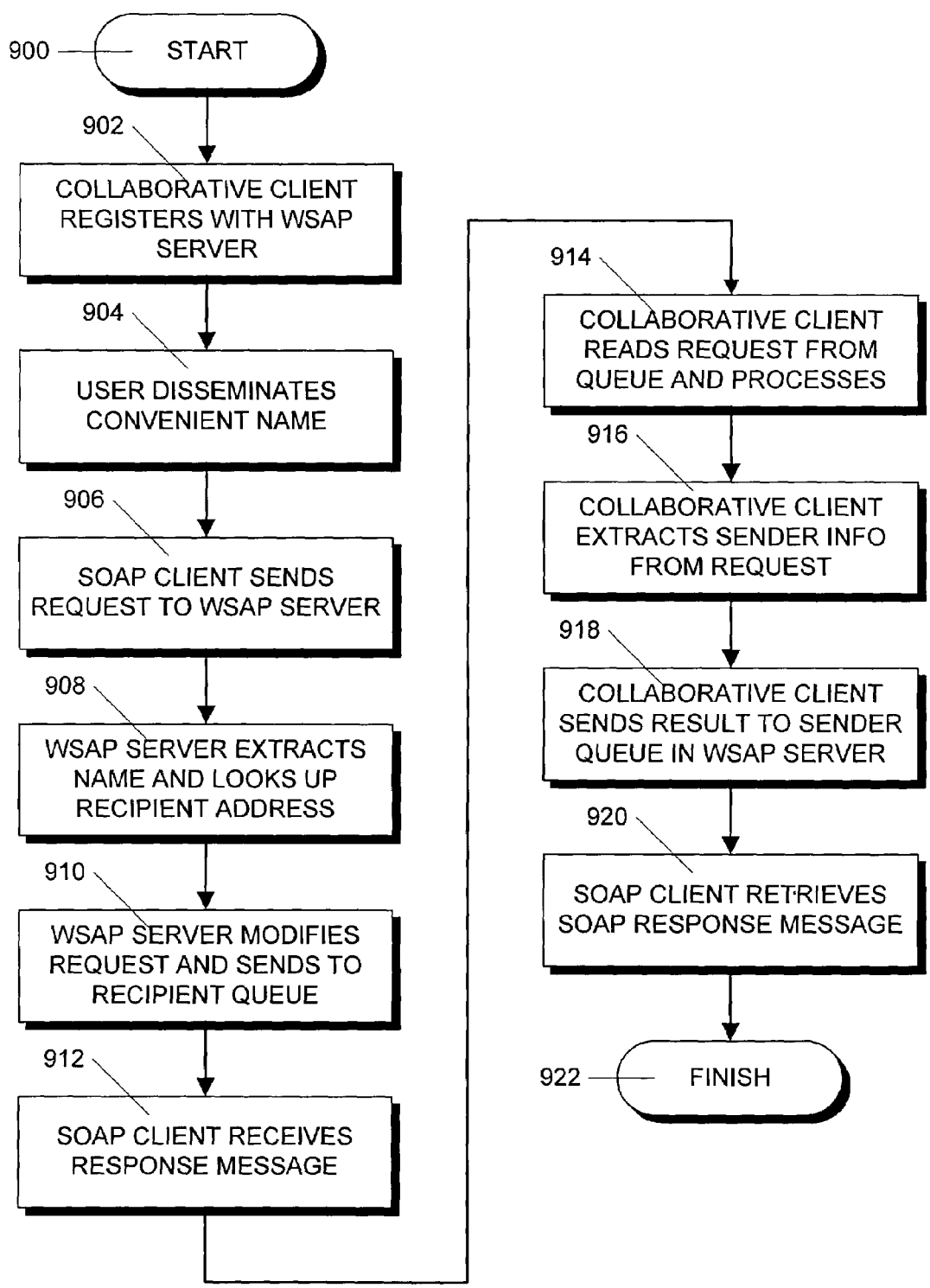
FIG. 9 is a flowchart that shows the steps in an illustrative process for processing a SOAP request using the system of FIG. 8.

FIG. 9 is a flowchart that shows the steps in an illustrative asynchronous process by which the SOAP client 800 accesses the collaborative client data. This process begins in step 900 and proceeds to step 902 where a collaborative client 816 that wants to expose its remote client interface registers a convenient name with the name service database in associated with the WSAP server/relay 806. This operation is illustrated schematically by arrow 810. In step 904, the owner of the collaborative client 816 then disseminates this convenient name to those who want to use SOAP interface to reach this collaborative client 816.

Later, as set forth in step 906, a SOAP client, such as client 800, makes a SOAP request to the server 806 by sending a SOAP message as indicated schematically by arrow 802.

In step 908, upon receiving a SOAP request, the server 806 checks the SOAP header and extracts the convenient name of the collaborative client 816. It then performs a name lookup with the name service database 808. It also checks the availability of the access information (user identity URL, relay URL, and optional device URL) for the collaborative client 816. This information identifies client queue 812 for this collaborative client 816.

In step 910, the server 806 modifies the SOAP request so that the response will return to the SOAP client queue 814. For example, the server 806 inserts into the SOAP header, as new header information, the result of the name lookup in database 808 into the SOAP request as the new header information, the HTTP POST URI value (from the HTTP header) and a unique message ID that it generates and that represents the source client "device" URL. Then the server 806 enqueues the modified SOAP request into the recipient's queue 812.

In step 912, the server 806 returns a response (indicated schematically by arrow 804 after it has successfully put the request into the collaborative client queue 812. As discussed above, this response does not carry the collaborative client's response, but only indicates whether the above operation is successful or not.

As indicated in step 914, the collaborative client 816 eventually reads the request from its queue 812 (indicated by arrow 822) and processes the request. In step 916, client 816 then extracts from the request the sender contact information, including the sender's server URL, identity URL and device URL (unique message ID.) Such information, along with a fixed (well-known) resource URL for SOAP processing, uniquely identifies the SOAP client queue 814 on the server 806. In step 918, the collaborative client 816 sends the result, in a SOAP response envelope format, to the server 806 by putting the result into the SOAP client queue 814 (as indicated schematically by arrow 824.)

The SOAP client 800 then polls the WSAP server 806 for any responses using a Read( ) call as discussed above and as set forth in step 920. The process then finishes in step 922.

Using a remote client interface, a collaborative client can also support the notification of certain events, such as when a new entry has added to the Discussion Tool, or when a new file has added to a Files tool. A SOAP client can specify the kind of events in which it is interested and receive notification of these events from the collaborative client by subscribing to these events.

Figure 10:
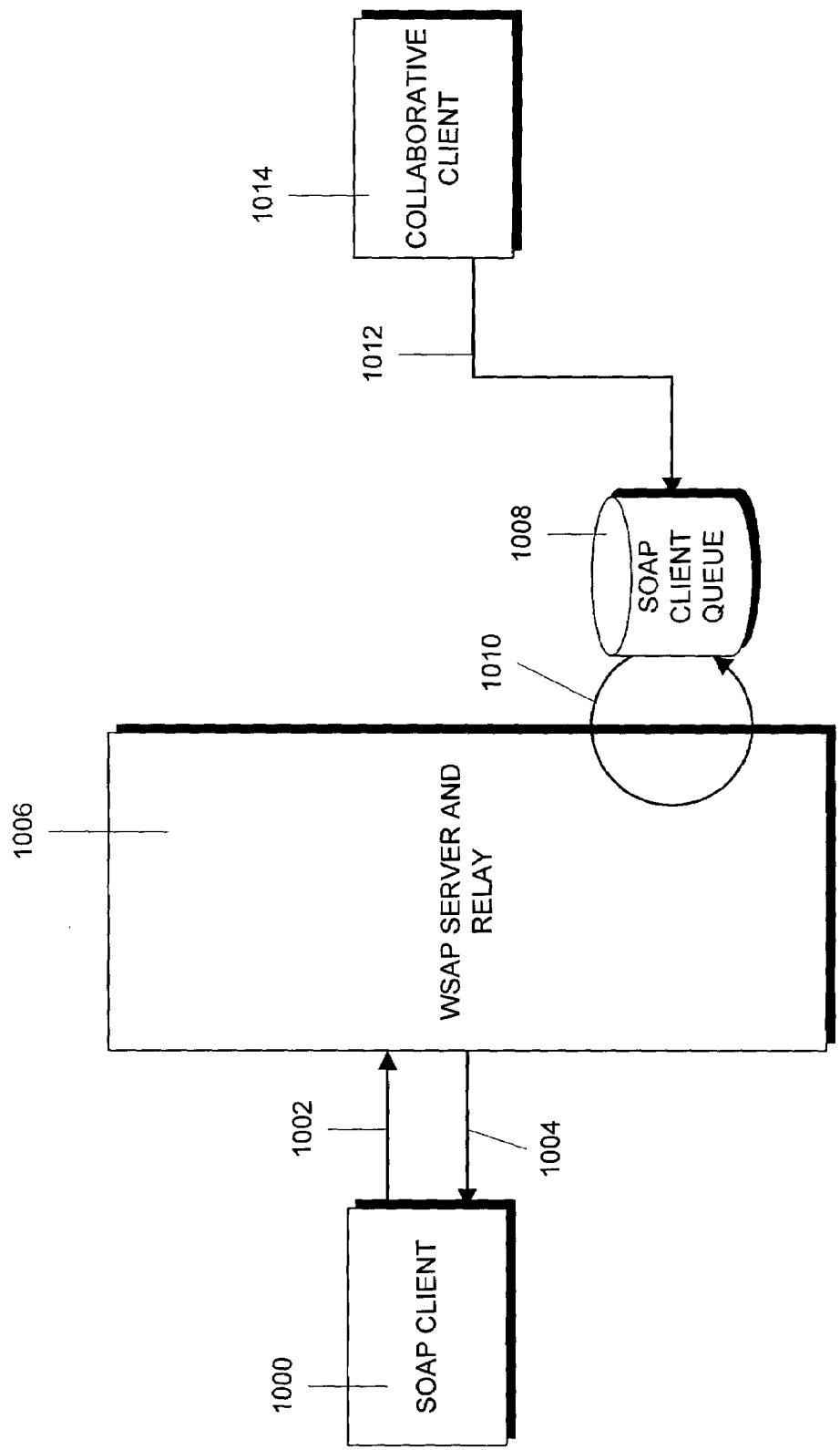
FIG. 10 is a block schematic diagram of an integrated system operating to provide event notification services.

FIG. 10 is a block schematic diagram that illustrates the notification process. To subscribe to an event, the SOAP client 1000 sends a request, through the server 1006, to the collaborative client 1014, specifying a source in which it is interested and a callback URL indicating the location to which the events should be sent. The SOAP client 1000 receives a unique subscription ID, which it can use later to renew and delete this subscription.

To retrieve events, the SOAP client 1000 uses an events service call, passing in the callback URL provided during the aforementioned subscription process as indicated schematically by arrow 1002. The server 1006 then checks the corresponding queue 1008 and waits if no messages are available as indicated schematically by arrow 1010. When an action that is subject to notification happens in the collaborative client 1014, the client 1014 generates an event and sends the event to the server 1006 using the callback URL specified in the subscription as indicated schematically by arrow 1012. The server 1006 will then put the event into the SOAP client queue 1008. When the server 1006 finds a new message in the queue, it de-queues the message and returns the message to the SOAP client 1000 as indicated by arrow 1004. The message can either be a response to a previous request or an event. The SOAP client 1000 can distinguish the event messages because an event message does not correlate with any previous request message.

Figure 11:
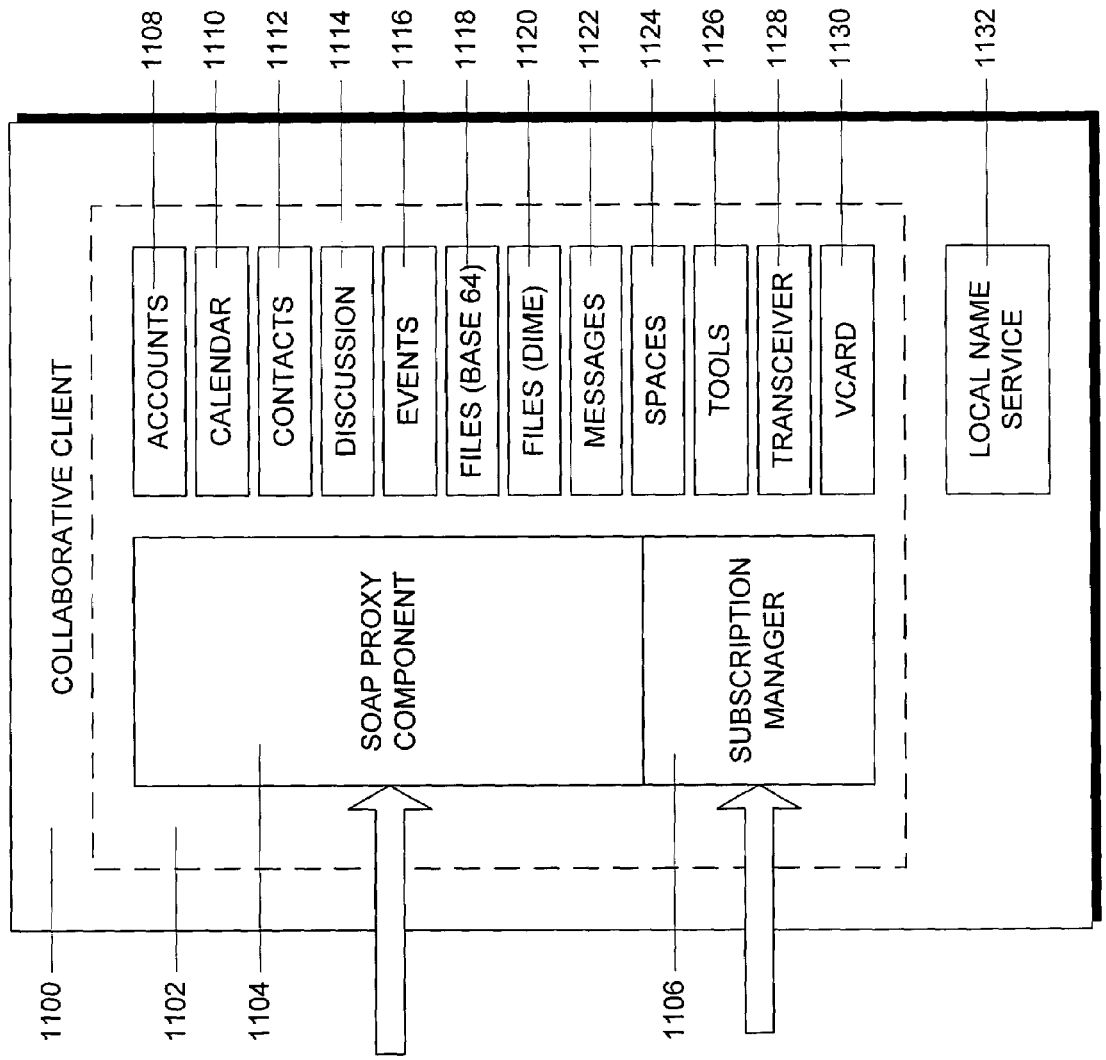
FIG. 11 is a block schematic diagram showing the SOAP interfaces and SOAP engine in an exemplary collaborative client.

FIG. 11 is a block schematic diagram showing the internal construction of a SOAP engine 1102 on an illustrative collaborative client 1100. The SOAP engine includes a SOAP proxy component 1104, a subscription manager 1106 and various services 1108-1114. The SOAP engine 1102 registers with a communication manager and indicates an interest in all data sent to aforementioned client queue in the WSAP server or relay server. In this manner, when the communication manager de-queues any data from this queue, the data, in the form of a SOAP envelope, is passed to the SOAP engine 1102 for processing.

Figure 12:
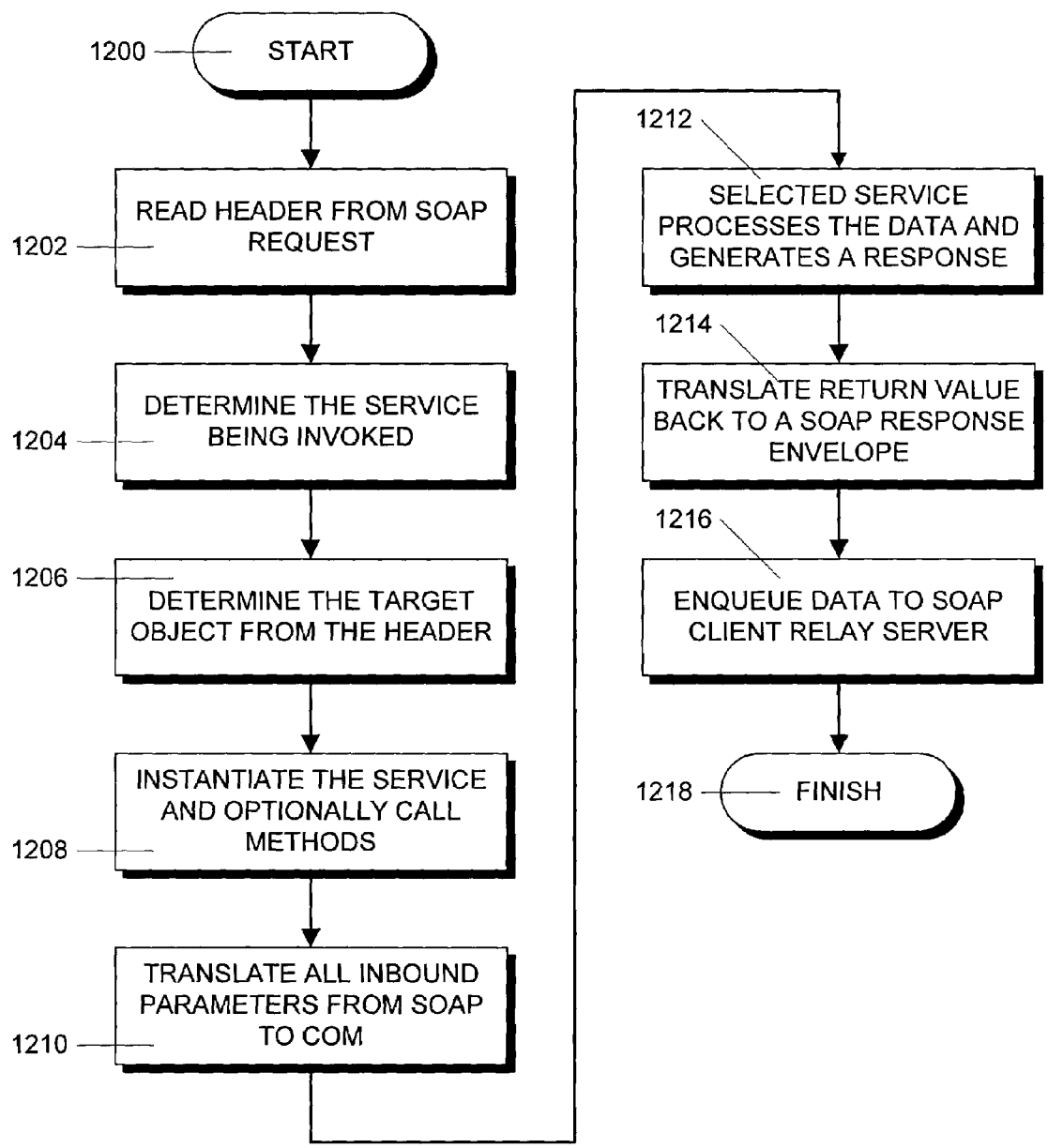
FIG. 12 is a flowchart illustrating the steps in an illustrative process for processing SOAP requests in a collaborative client with a SOAP proxy component.

The SOAP proxy component 1104 is a component that translates SOAP RPC requests into method invocations on a target COM interface. The component 1104 is initialized with the system services on the collaborative client, and listens for incoming HTTP communications. FIG. 12 is a flowchart that illustrates the steps in servicing an incoming SOAP request. This process starts in step 1200 and proceeds to step 1202 where the SOAP proxy component 1104 reads the header from the SOAP request. Next, in step 1204, the SOAP proxy component determines the service being invoked and, in step 1206, the proxy component determines the target object from the header.

Then, in step 1208, the proxy component instantiates the service and optionally calls methods on the service if it implements certain interfaces, to determine more detailed context about the method. In step 1210, the proxy component translates all inbound parameters from a SOAP representation to a COM (VARIANT) representation. In order to handle custom data types, the services being called must implement data serializers. This interface is installed at initialization time of the service. A serializer must implement two methods:

Serialize(IUnknown* i_pValue, IGrooveWebServicesSerializationInfo*);

and

Deserialize(IGrooveWebServicesSerializationInfo*, IUnknown** o_ppValue);

The IGrooveEdgeWebServicesSerializationInfo argument allows a serializer to describe the contents of its data using name-value pairs. This is done independently of any format used to transmit the data over the network. The serialization information is written to and from SOAP using IGrooveSOAPReader and IGrooveSOAPWriter methods. This separation allows the network transmission format to change without requiring a change in the serialization code.

When the SOAP proxy component 1104 encounters a data type, by reading type library information, it will first attempt to translate it to an intrinsic data type, such as an "integer" or "string." However, if the data type is a user defined type, a type library will be used to identity the GUID, or interface ID of the type. A sub-component called a type mapper maintains a map from GUID to serializer interface and calls the serializer to serialize or de-serialize the data to and from SOAP.

Next, in step 1212, the selected service processes the data and generates a response. In step 1214, the proxy component translates any return value back to a SOAP response envelope. The return value is serialized the same way that the request was serialized. A SOAPWriter method transforms the serialization information into the SOAP response section of the SOAP envelope. In step 1216, the SOAP proxy component then enqueues the data to a remote device URL corresponding to the SOAP client relay server or passes the envelope back to the local SOAP server, depending on the origin of the original request.

In particular, the SOAP engine 1102, after processing the request, returns the result, in a SOAP response envelope, to a specific queue owned by the SOAP client. This queue, as any other queues, is defined with a triple: {IdentityURL, DeviceURL, ResourceURL}. The engine 1102 obtains such information from the original SOAP request, as its header contains the needed information, including the server URL. The resource URL is the same SOAP specific one (a well-known one for the server and the collaborative client). The process then finishes in step 1218.

Eleven services are illustrated. These include the accounts service 1108, the calendar service 1110, the contacts service 1112, the discussion service 1114, the events service 1116 the files (base 64) service 1118, the files (DIME) service 1120, the messages service 1122, the spaces service 1124, the tools service 1126 and the transceiver service 1128. Each service implements supports up to four methods, including Create( ), Read( ), Update( ) and Delete( ) methods. The Read( ) method retrieves a record or list of records. The Create( ) method creates a new record. The Update( ) method modifies an existing record and the Delete( ) method deletes an existing record. Each method is responsible for updating or returning collaborative data. In addition, services may provide similar methods that operate on data items managed by the service.

The accounts service 1108 provides information about all the accounts on the local collaborative device and is a starting point for a hierarchical access to all web services available on the device. It supports a Read( ) method that provides information about all collaborative accounts on the device. For security reasons, this service is only available from a local web service client.

The calendar service 1110 provides information about the events in a collaborative calendar tool and enables a SOAP client to create new events and delete or modify existing events. It supports Create( ) and Read( ) methods that create and read entries in the calendar tool. When the Read( ) method is used, it returns the data in each entry and the URI of that entry. In addition, this service supports ReadEntry( ), UpdateEntry( ) and DeleteEntry( ) methods that read, modify and delete calendar entries identified by a URI.

The contacts service 1112 provides information about the collaborative contacts stored for an identity. It supports a Read( ) method that returns information about all contacts associated with an identity, including contacts from shared spaces and any personal contact lists.

The discussion service 1114 provides information about the entries in a discussion tool and enables a SOAP client to create new entries and delete or modify existing entries. It supports Create( ) and Read( ) methods that create and read entries in the discussion tool. When the Read( ) method is used, it returns the data in each entry and the URI of that entry. In addition, this service supports ReadEntry( ), UpdateEntry( ) and DeleteEntry( ) methods that read, modify and delete discussion entries identified by a URI.

The events service 1116 provides a mechanism for SOAP clients to retrieve web services events. The subscriptions service (discussed below) creates and manages a queue for the events. If the SOAP client is local, the collaborative client queues events as they are emitted from the underlying tool. However, if the SOAP client is remote, then the collaborative client sends the events to the subscription service as they are emitted and the subscription service queues the events. The events service supports a Read( ) method that reads events from SOAP client subscriptions and returns an array of events. If the SOAP client is local, then the service returns an array of events that includes all events that have been emitted since a previous Read( ) method call. Alternatively, if the SOAP client is remote, the SOAP proxy component returns only one event in an array for each Read( ) method call. Therefore, the remote SOAP client must call the Read( ) method repeatedly until no more events are returned.

The files (base 64) service 1118 provides information about files in a files tool and enables a SOAP client to read the contents of a file, create a new file, and delete or modify an existing file. This service uses Base64 to encode the file contents. The service supports Create( ), Read( ) and Delete( ) methods that create a file or folder with specified descriptors and contents and read files and directories. When the Read( ) method is used, it returns the data in each file and the URI of that file. In addition, this service supports ReadFile( ) and UpdateFile( ) methods that read the files and modify the content and name of files identified by a URI.

The files (DIME) service 1120 operates in the same manner and supports the same methods as the files (Base64) service 1118, with the exception that it uses the SOAP DIME protocol to transfer the file contents.

The messages service 1122 provides a mechanism for remote SOAP clients to retrieve messages sent by the collaborative client but not received by the SOAP client because the time-to-live had expired. This service supports the aforementioned Read( ) method uses by remote SOAP clients to retrieve the messages. It is provided by the SOAP proxy component and is not available to local SOAP clients.

The spaces service 1124 provides information about shared spaces owned by a specified identity. It supports a Read( ) method.

The tools service 1126 provides information about the tools in a shared space via a Read( ) method.

The transceiver service 1128 allows an external application to open a workspace window on the local device and direct the user to a specified URL or enables the user to send an instant message or shared space invitation. It can only be used by a local SOAP client and supports three specialized methods. These include SendInstantMessage( ) the opens a window to send an instant message to a specified identity; SendInvitation( ) that opens a window to invite the specified identity to a shared space and View( ) that opens a window to display a specified tool to a specified identity.

The V-card service 1130 provides additional information about an identity, which information would typically be found in a v-card, such as an e-mail address and full name. This service supports a Read( ) method.

The subscription manager 1106 implements a subscription service that allows a remote endpoint to subscribe to any supported data model to receive notifications. The subscription service has an API that includes three methods: Create( ), Delete( ) and Update( ). The Create( ) method creates a new subscription to events emitted by the specified web service. When a remote client wants to subscribe to events, it must provide four parameters. The first parameter is called the event class and is a string that is used by a service designer to identify an event class that it will support. An example is "urn:groove.net:DiscussionToolEvent." The second parameter is an event source URL. This is usually a bindable URL to the component that will fire the event. The third parameter is a callback URL, which is a URL that identifies the recipient of the event. The callback URL allows the system to implement event notification using different URL schemes, such as mailto:, http:, ftp, and dpp. The last parameter is a time to live value that allows subscribers to specify the number of days that the subscription should last. The service returns a subscription ID that can be used to renew, or unsubscribe from the event source. The Delete( ) method deletes a subscription and the Update( ) method renews the subscription for a specified time to live.

Internally, the subscription manager 1106 maps an event type to a "subscriber factory." The subscriber factory is a COM interface implemented by a service. When a subscription is created, the subscription manager uses the subscriber factory to create a "subscriber." The subscriber represents the actual connection from the data model object to an event handler internal to the service that uses COM connection points to receive the notification from the data model object.

When a subscriber gets a notification it informs the subscription manager using a serialized format of the event data, and the subscription manager, in turn, uses protocol handlers to dispatch the event to the appropriate remote endpoint. Subscribers can be activated and deactivated when needed.

The subscription manager implements interfaces for creating and renewing subscriptions, and for sending out event data. An IGrooveEdgeServicesSubscriptionContext interface contains information about the subscription: the event type, the subscription ID, the source URL and its containing objects (Tool, Telespace, and Account). An IGrooveEdgeServicesSubscriberFactory interface creates subscribers based on event type. An IGrooveEdgeServicesSubscriber interface, when activated, uses the subscription context to bind to the data model and its connection point container interface to connect for internal events. It also uses an IGrooveEdgeServicesSerializationInfo interface to forward the event data to the subscription manager.

For local SOAP usage, a local name service 1132 is provided. This service will allow a user to register an alias for a supported data model object and functions identically to the name service discussed above, but without any server dependencies so that local client(s) can work in the off-line mode. It will also provide a way to register local names with the aforementioned name service.

When a collaborative client decides to register a name, it registers the name with the name service, as described above and with the local name service. A name can be registered with the local name service only (where this name will only be resolved locally). A name registered with the name service will also be registered with the local name service as well. The latter practice ensures the support of direct access to the collaborative client from a remote client without going through any server, which may act to resolve the name with its name service. In the direct case, the collaborative client uses the local name service to resolve the name, thus working without the dependency of an online name service server.

To register a name with either the name service or the local name service, the user creates an XML file containing a request to add a user name and the values to which it corresponds. The XML file may also contain a request to remove a user name. The following is an example of such an XML file:

```
<GNSRequests>
    <AddGNSNames>
        <UserName>
            <GNSName>
                Username1
```

-continued

```
        </GNSName>
        <GNSNameSpace>
            SOAP
        </GNSNameSpace>
        <GNSNameData>
            <Item>
                <Name>
                    GrooveIdentityURL
                </Name>
                <Value>
                    GrooveIdentityURL__value__1
                </Value>
            </Item>
            <Item>
                <Name>
                    GrooveClientDeviceURL
                </Name>
                <Value>
                    GrooveClientDeviceURL__value__1
                </Value>
            </Item>
            <Item>
                <Name>
                    GrooveClientRelayURL
                </Name>
                <Value>
                    GrooveClientRelayURL__value__1
                </Value>
            </Item>
        </GNSNameData>
    </UserName>
</AddGNSNames>
<RemoveGNSNames>
    <UserName>
        <GNSName>
            Username2
        </GNSName>
        <GNSNameSpace>
            SOAP
        </GNSNameSpace>
        <RenewKey>
            067fc9caea8d44b68f18ebb6e9c76acf
        </RenewKey>
    </UserName>
</RemoveGNSNames>
</GNSRequests>
```

Registration in the local name service is performed by a registration utility that reads the XML file and creates or appends registration data to an XML file in the collaborative system data directory or a subdirectory of the collaborative system data directory. This latter XML file is used for name resolution.

Name service registration is performed by using the registration utility to serialize the XML file containing the registration request and send the resulting SOAP message to the name service. The registration utility de-serializes the response from the name service and prints a message describing the status of the registration request.

As discussed above, complete SOAP envelopes are sent from the illustrative server to the collaborative client, through its queue. However, since the collaborative client must support these SOAP calls as well, it can also handle SOAP requests made directly from SOAP clients as well using the same message format.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, protocols and translations different from those shown may be performed. Other aspects, such as the specific process flow and the order of the illustrated steps, as well as other modifications to the inventive concept are intended to be covered by the appended claims.

What is claimed is:

1. A method for providing access over a network to data and services available within a collaborative computer system, the collaborative system comprising a plurality of collaborative clients, the method comprising:

a) maintaining, by each collaborative client, data based on user interactions with the collaborative system, the maintaining comprising, for each collaborative client, having a local copy of collaborative data and forwarding data change requests to other collaborative clients and using data change requests in modifying the local copy;

b) providing access to the collaborative data in response to a request message from a non-native client, the non-native client accessing the collaborative data other than through the collaborative system, the request message containing information identifying the non-native client;

c) receiving the request message in a server connected to the non-native client, extracting from the request message the information identifying the non-native client and modifying the request message by replacing the information identifying the non-collaborative client with information identifying a queue in the server, the queue being associated with the non-native client and the server;

d) sending the modified request message to a collaborative client of the plurality of collaborative clients via the network, wherein the request message specifies collaborative data to update or return, and the collaborative client provides a response message based on the request message;

e) sending the response message to the server queue identified in the modified request message, and f) using the information in the server identifying the non-native client to forward the response message from the server queue to the non-collaborative client.

2. The method of claim 1 further comprising:
(e) before step (a) is performed, the collaborative client publishing a convenient name associated with at least a portion of the data and services available within the collaborative computer system.

3. The method of claim 2 wherein the request message includes the convenient name and step (a) comprises:
(a1) extracting from the request message the convenient name; and
(a2) using the convenient name to retrieve information identifying a location of the collaborative client that can provide the at least a portion of the data and services.

4. The method of claim 2 wherein step (b) comprises:
(b1) sending the modified request message directly to the collaborative client when the collaborative client is connected to the network; and
(b2) sending the modified request message to a relay server when the collaborative client is not connected to the network.

5. The method of claim 4 wherein the server is part of the relay server that connects the non-native client to the network.

6. The method of claim 4 wherein the server waits on the server queue after step (b) and wherein step (d) further comprises:
(d1) forwarding the response message from the server queue to the non-native client when the response message is received in the server queue.

7. The method of claim 4 wherein the server does not wait for a response in step (b) and wherein step (d) is performed in response to a method call by the non-native client.

8. The method of claim 7 wherein the request message contains a unique request identifier and wherein the response message returns the unique request identifier to the non-native client and the non-native client compares the request identifier sent in the request message with the request identifier in the response message to determine if the response is associated with the request.

9. The method of claim 4 further comprising:
(e) subscribing to an event service at the collaborative client indicating a request for notification of selected actions in the collaborative system; and
(f) the collaborative client placing event messages in the server queue when a selected action occurs.

10. The method of claim 9 wherein:
the request and the response messages have a same protocol; and
the protocol is the Simple Object Access Protocol (SOAP).

11. The method of claim 10, wherein:
the request message identifies a specific collaborative client with a collaborative client identifier; and
the server:
performs a name lookup of the collaborative client identifier to determine a name look-up result for the collaborative client;
removes the collaborative client identifier from the message; and
adds the name lookup result to the message.

12. Apparatus for providing access over a network to data and services, the apparatus comprising:
a collaborative system comprising a plurality of collaborative clients, each collaborative client having a local copy of collaborative data and being adapted to forward data change requests to other collaborative clients and use data change requests in modifying the local copy;
an external client, the external client being external to the collaborative system and being adapted to send a request message, the request message containing information identifying the external client, wherein the collaborative system is adapted to provide access to the collaborative data in response to the request message;
a server connected to the external client, including means for receiving the request message, means for extracting from the request message the information identifying the external client and means for modifying the request message by replacing the information identifying the external client with information identifying a queue in the server, the queue being associated with the external client and the server;
a first communication mechanism for sending the modified request message to a collaborative client of the plurality of collaborative clients via the network, wherein the collaborative client provides a response message containing the data and services requested;
a second communication mechanism for storing the response message in the server queue identified in the modified request message, the queue being associated with the external client, and
a contact mechanism responsive to the information in the server identifying the external client for forwarding the response message from the server queue to the external client.

13. The apparatus of claim 12 further comprising means operable by the collaborative client for publishing a convenient name associated with selected data and services available in the collaborative computer system before the external client generates the request message.

14. The apparatus of claim 13 wherein the request message includes the convenient name and wherein the receiving means in the server comprises a mechanism for extracting from the request message the convenient name and a name service that is responsive to the convenient name for retrieving information identifying the location of the collaborative client that can provide the selected data and services.

15. The apparatus of claim 12 wherein the first communication mechanism comprises:
means for sending the modified request message directly to the collaborative client when the collaborative client is connected to the network; and
means for sending the modified request message to a relay server when the collaborative client is not connected to the network.

16. The apparatus of claim 15 wherein the server is part of the relay server that connects the external client to the network.

17. The apparatus of claim 12 wherein the server waits on the server queue after the first communication mechanism sends the request message to the collaborative client and wherein the contact mechanism comprises means for forwarding the response message from the server queue to the external client when the response message is received in the server queue.

18. The apparatus of claim 12 wherein the server does not wait for a response in after the first communication mechanism sends the request message to the collaborative client and wherein the contact mechanism sends forwarding the response message from the server queue to the client in response to a method call by the non-collaborative client.

19. The apparatus of claim 18 wherein the request message contains a unique request identifier and wherein the response message returns the unique request identifier to the external client and the external client comprises a comparator that compares the request identifier sent in the request message with the request identifier in the response message to determine if the response is associated with the request.

20. The apparatus of claim 12 further comprising:
a subscription service responsive to a request from the external client for subscribing to an event service at the collaborative client indicating a request for notification of selected actions in the collaborative system; and
an event mechanism in the collaborative client that places event messages in the server queue when a selected action occurs.

21. The apparatus of claim 12 wherein:
the request and the response messages have the same protocol; and
the protocol is the Simple Object Access Protocol.

22. The method of claim 21, wherein the queue is identified with a generated device URL associated with a SOAP header.

23. A computer program product for providing access over a network to data and services available within a collaborative computer system, the collaborative system comprising a plurality of collaborative clients, the computer program product comprising a tangible computer usable medium having computer readable program code thereon, including:
program code for maintaining, by each collaborative client, data based on user interactions with the collaborative system, the maintaining comprising, for each collaborative client, having a local copy of collaborative data and forwarding data change requests to other collaborative clients and using data change requests in modifying the local copy;
program code for providing access to the collaborative data in response to a request message from a non-native client the non-native client accessing the collaborative data other than through the collaborative system, the request containing information identifying the non-native client;
program code for receiving the request message in a server connected to the non-native client, extracting from the request message the information identifying the non-native client and modifying the request message by replacing the information identifying the non-native client with information identifying a queue in the server;
program code for sending the modified request message to a collaborative client in the collaborative computer system via the network, wherein the collaborative client provides a response message containing the data and services requested from the collaborative system;
program code for sending the response message to the server queue identified in the modified request message, and
program code for using the information in the server identifying the non-native client to forward the response message from the server queue to the non-native client, the queue being associated with the non-native client and the server.

* * * * *